US008572408B2

(12) United States Patent
Candelore

(10) Patent No.: US 8,572,408 B2
(45) Date of Patent: Oct. 29, 2013

(54) DIGITAL RIGHTS MANAGEMENT OF A DIGITAL DEVICE

(75) Inventor: Brant L. Candelore, Escondido, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1695 days.

(21) Appl. No.: 10/962,830

(22) Filed: Oct. 11, 2004

(65) Prior Publication Data

US 2005/0063541 A1 Mar. 24, 2005
US 2006/0198519 A9 Sep. 7, 2006

Related U.S. Application Data

(63) Continuation-in-part of application No. 10/388,002, filed on Mar. 12, 2003, now Pat. No. 7,724,907.

(60) Provisional application No. 60/424,381, filed on Nov. 5, 2002, provisional application No. 60/558,386, filed on Mar. 31, 2004.

(51) Int. Cl.
*G06F 11/30* (2006.01)
*G06F 12/14* (2006.01)
*G06F 21/00* (2013.01)

(52) U.S. Cl.
USPC .................................................. 713/193

(58) Field of Classification Search
USPC .......... 380/239, 281, 200, 201, 210; 713/155, 713/193, 165, 170, 189
See application file for complete search history.

(56) References Cited

U.S. PATENT DOCUMENTS

| 3,852,519 | A | 12/1974 | Court ............................ 178/5.1 |
| 4,381,519 | A | 4/1983 | Wilkinson et al. |
| 4,419,693 | A | 12/1983 | Wilkinson |
| 4,521,853 | A | 6/1985 | Guttag |
| 4,535,355 | A | 8/1985 | Arn et al. |

(Continued)

FOREIGN PATENT DOCUMENTS

| CA | 2389247 | 5/2001 |
| CA | 2328645 | 7/2001 |

(Continued)

OTHER PUBLICATIONS

Huang et al. "Efficient Key Distribution Schemes for Secure Media Delievery in Pay-TV Systems." IEEE Transactions on Multimedia, vol. 6, No. 5, Oct. 2004.*

(Continued)

*Primary Examiner* — Edan Orgad
*Assistant Examiner* — Kari Schmidt
(74) *Attorney, Agent, or Firm* — Blakely, Sokoloff, Taylor & Zafman LLP

(57) ABSTRACT

According to one embodiment, an apparatus involves the descrambling of scrambled digital content using a one-time programmable key and digital rights management. The apparatus comprises a processor and a descrambler. The processor is adapted to execute a Digital Rights Management (DRM) function in order to determine whether each entitlement needed to access the digital content is pre-stored. The descrambler is adapted to decrypt encrypted information using a Unique Key stored within the one-time programmable memory. After determining that each entitlement needed to access the digital content is pre-stored, the decrypted information is used to generate a key, which is used to decrypt at least one service key for descrambling the scrambled digital content.

19 Claims, 11 Drawing Sheets

(56) References Cited

U.S. PATENT DOCUMENTS

| | | | |
|---|---|---|---|
| 4,634,808 A | 1/1987 | Moerder | |
| 4,700,387 A | 10/1987 | Hirata | |
| 4,703,351 A | 10/1987 | Kondo | |
| 4,703,352 A | 10/1987 | Kondo | |
| 4,710,811 A | 12/1987 | Kondo | |
| 4,712,238 A | 12/1987 | Gilhousen et al. | |
| 4,722,003 A | 1/1988 | Kondo | |
| 4,739,510 A | 4/1988 | Jeffers et al. | 380/15 |
| 4,772,947 A | 9/1988 | Kono | |
| 4,785,361 A | 11/1988 | Brotby | |
| 4,788,589 A | 11/1988 | Kondo | |
| 4,802,215 A | 1/1989 | Mason | 380/21 |
| 4,803,725 A | 2/1989 | Horne et al. | 380/44 |
| 4,815,078 A | 3/1989 | Shimura | |
| 4,845,560 A | 7/1989 | Kondo et al. | |
| 4,887,296 A | 12/1989 | Horne | |
| 4,890,161 A | 12/1989 | Kondo | |
| 4,924,310 A | 5/1990 | von Brandt | |
| 4,944,006 A | 7/1990 | Citta et al. | 380/20 |
| 4,953,023 A | 8/1990 | Kondo | |
| 4,989,245 A | 1/1991 | Bennett | |
| 4,995,080 A | 2/1991 | Bestler et al. | 380/21 |
| 5,018,197 A | 5/1991 | Jones et al. | 380/20 |
| 5,023,710 A | 6/1991 | Kondo et al. | |
| 5,029,208 A | 7/1991 | Tanaka | |
| 5,091,936 A | 2/1992 | Katznelson et al. | 380/19 |
| 5,122,873 A | 6/1992 | Golin | |
| 5,124,117 A | 6/1992 | Tatebayashi et al. | |
| 5,138,659 A | 8/1992 | Kelkar et al. | |
| 5,142,537 A | 8/1992 | Kutner et al. | |
| 5,144,662 A | 9/1992 | Welmer | |
| 5,144,664 A | 9/1992 | Esserman et al. | |
| 5,151,782 A | 9/1992 | Ferraro | |
| 5,159,452 A | 10/1992 | Kinoshita et al. | |
| 5,196,931 A | 3/1993 | Kondo | |
| 5,208,816 A | 5/1993 | Seshardi et al. | |
| 5,237,424 A | 8/1993 | Nishino et al. | |
| 5,237,610 A | 8/1993 | Gammie et al. | |
| 5,241,381 A | 8/1993 | Kondo | |
| 5,247,575 A | 9/1993 | Sprague et al. | 380/9 |
| 5,258,835 A | 11/1993 | Kato | |
| 5,319,707 A | 6/1994 | Wasilewski et al. | |
| 5,325,432 A | 6/1994 | Gardeck et al. | 380/21 |
| 5,327,502 A | 7/1994 | Katata | |
| 5,341,425 A | 8/1994 | Wasilewski et al. | |
| 5,359,694 A | 10/1994 | Concordel | |
| 5,379,072 A | 1/1995 | Kondo | |
| 5,381,481 A | 1/1995 | Gammie et al. | |
| 5,398,078 A | 3/1995 | Masuda et al. | |
| 5,400,401 A | 3/1995 | Wasilewski et al. | |
| 5,414,852 A | 5/1995 | Kramer et al. | |
| 5,416,651 A | 5/1995 | Uetake et al. | |
| 5,416,847 A | 5/1995 | Boze | |
| 5,420,866 A | 5/1995 | Wasilewski et al. | 370/110.1 |
| 5,428,403 A | 6/1995 | Andrew et al. | |
| 5,434,716 A | 7/1995 | Sugiyama et al. | |
| 5,438,369 A | 8/1995 | Citta et al. | |
| 5,444,491 A | 8/1995 | Lim | |
| 5,455,862 A | 10/1995 | Hoskinson | |
| 5,469,216 A | 11/1995 | Takahashi et al. | |
| 5,471,501 A | 11/1995 | Parr et al. | |
| 5,473,692 A | 12/1995 | Davis | |
| 5,481,554 A | 1/1996 | Kondo | |
| 5,481,627 A | 1/1996 | Kim | |
| 5,485,577 A | 1/1996 | Eyer et al. | |
| 5,491,748 A | 2/1996 | Auld, Jr. et al. | |
| 5,526,427 A | 6/1996 | Thomas et al. | |
| 5,528,608 A | 6/1996 | Shimizume | |
| 5,535,276 A | 7/1996 | Ganesan | 380/25 |
| 5,539,823 A | 7/1996 | Martin et al. | 380/20 |
| 5,539,828 A | 7/1996 | Davis | |
| 5,555,305 A | 9/1996 | Robinson et al. | 380/14 |
| 5,561,713 A | 10/1996 | Suh | 380/10 |
| 5,568,552 A | 10/1996 | Davis | |
| 5,574,787 A | 11/1996 | Ryan | |
| 5,582,470 A | 12/1996 | Yu | |
| 5,583,576 A | 12/1996 | Perlman et al. | |
| 5,583,863 A | 12/1996 | Darr, Jr. et al. | |
| 5,590,202 A | 12/1996 | Bestler et al. | |
| 5,594,507 A | 1/1997 | Hoarty | |
| 5,598,214 A | 1/1997 | Kondo et al. | |
| 5,600,721 A | 2/1997 | Kitazato | |
| 5,606,359 A | 2/1997 | Youden et al. | |
| 5,608,448 A | 3/1997 | Smoral et al. | 348/7 |
| 5,615,265 A | 3/1997 | Coutrot | |
| 5,617,333 A | 4/1997 | Oyamada et al. | |
| 5,625,715 A | 4/1997 | Trew et al. | |
| 5,629,981 A | 5/1997 | Nerlikar | |
| 5,652,795 A | 7/1997 | Eillon et al. | |
| 5,663,764 A | 9/1997 | Kondo et al. | |
| 5,666,293 A | 9/1997 | Metz et al. | |
| 5,696,906 A | 12/1997 | Peters et al. | |
| 5,699,429 A | 12/1997 | Tamer et al. | |
| 5,703,889 A | 12/1997 | Shimoda et al. | |
| 5,717,814 A | 2/1998 | Abecassis | 386/46 |
| 5,726,702 A | 3/1998 | Hamaguchi et al. | |
| 5,732,346 A | 3/1998 | Lazaridis et al. | |
| 5,742,680 A | 4/1998 | Wilson | 380/16 |
| 5,742,681 A | 4/1998 | Giachetti et al. | 380/20 |
| 5,751,280 A | 5/1998 | Abbott et al. | 345/302 |
| 5,751,743 A | 5/1998 | Takizawa | |
| 5,751,813 A | 5/1998 | Dorenbos | 380/49 |
| 5,754,650 A | 5/1998 | Katznelson | 380/15 |
| 5,757,417 A | 5/1998 | Aras et al. | 348/10 |
| 5,757,909 A | 5/1998 | Park | |
| 5,768,539 A | 6/1998 | Metz et al. | |
| 5,784,464 A * | 7/1998 | Akiyama et al. | 713/155 |
| 5,787,171 A | 7/1998 | Kubota et al. | |
| 5,787,179 A | 7/1998 | Ogawa et al. | |
| 5,790,842 A * | 8/1998 | Charles et al. | 713/600 |
| 5,796,786 A | 8/1998 | Lee | |
| 5,796,829 A | 8/1998 | Newby et al. | |
| 5,796,840 A | 8/1998 | Davis | |
| 5,802,176 A | 9/1998 | Audebert | |
| 5,805,700 A | 9/1998 | Nardone et al. | 380/10 |
| 5,805,712 A | 9/1998 | Davis | |
| 5,805,762 A | 9/1998 | Boyce et al. | |
| 5,809,147 A | 9/1998 | De Lange et al. | 380/28 |
| 5,815,146 A | 9/1998 | Youden et al. | 345/327 |
| 5,818,934 A | 10/1998 | Cuccia | |
| 5,825,879 A | 10/1998 | Davis | |
| 5,850,218 A | 12/1998 | LaJoie et al. | |
| 5,852,290 A | 12/1998 | Chaney | |
| 5,852,470 A | 12/1998 | Kondo et al. | |
| 5,870,474 A | 2/1999 | Wasilewski et al. | |
| 5,894,320 A | 4/1999 | Vancelette | 348/7 |
| 5,894,516 A | 4/1999 | Brandenburg | 380/4 |
| 5,897,218 A | 4/1999 | Nishimura et al. | 386/94 |
| 5,915,018 A | 6/1999 | Aucsmith | 380/4 |
| 5,917,830 A | 6/1999 | Chen et al. | |
| 5,917,915 A | 6/1999 | Hirose | |
| 5,922,048 A | 7/1999 | Emura | 709/219 |
| 5,923,486 A | 7/1999 | Sugiyama et al. | |
| 5,923,755 A | 7/1999 | Birch | |
| 5,930,361 A | 7/1999 | Hayashi et al. | |
| 5,933,500 A | 8/1999 | Blatter et al. | |
| 5,940,738 A | 8/1999 | Rao | |
| 5,949,877 A | 9/1999 | Traw et al. | |
| 5,949,881 A | 9/1999 | Davis | |
| 5,963,909 A | 10/1999 | Warren et al. | |
| 5,973,679 A | 10/1999 | Abbott et al. | 345/302 |
| 5,973,722 A | 10/1999 | Wakai et al. | |
| 5,999,622 A | 12/1999 | Yasukawa et al. | 380/4 |
| 5,999,698 A | 12/1999 | Nakai et al. | 386/125 |
| 6,005,561 A | 12/1999 | Hawkins et al. | 345/327 |
| 6,011,849 A | 1/2000 | Orrin | 380/42 |
| 6,012,144 A | 1/2000 | Pickett | 713/201 |
| 6,016,348 A | 1/2000 | Blatter et al. | |
| 6,021,199 A | 2/2000 | Ishibashi | 380/10 |
| 6,021,201 A | 2/2000 | Bakhle et al. | |
| 6,026,164 A | 2/2000 | Sakamoto et al. | |
| 6,028,932 A | 2/2000 | Park | |
| 6,049,613 A | 4/2000 | Jakobsson | 380/47 |
| 6,055,314 A | 4/2000 | Spies et al. | |

(56) References Cited

U.S. PATENT DOCUMENTS

| | | | |
|---|---|---|---|
| 6,055,315 A | 4/2000 | Doyle et al. | |
| 6,057,872 A | 5/2000 | Candelore | 348/3 |
| 6,058,186 A | 5/2000 | Enari | 380/10 |
| 6,058,192 A | 5/2000 | Guralnick et al. | |
| 6,061,451 A | 5/2000 | Muratani et al. | |
| 6,064,748 A | 5/2000 | Hogan | 382/100 |
| 6,065,050 A | 5/2000 | DeMoney | 709/219 |
| 6,069,647 A | 5/2000 | Sullivan et al. | |
| 6,072,872 A | 6/2000 | Chang et al. | |
| 6,072,873 A | 6/2000 | Bewick | 380/217 |
| 6,073,122 A | 6/2000 | Wool | |
| 6,088,450 A | 7/2000 | Davis et al. | |
| 6,105,134 A | 8/2000 | Pinder et al. | |
| 6,108,422 A | 8/2000 | Newby et al. | |
| 6,115,821 A | 9/2000 | Newby et al. | |
| 6,118,873 A | 9/2000 | Lotspiech et al. | |
| 6,125,349 A | 9/2000 | Maher | |
| 6,134,237 A | 10/2000 | Brailean et al. | |
| 6,134,551 A | 10/2000 | Aucsmith | |
| 6,138,237 A | 10/2000 | Ruben et al. | |
| 6,154,206 A | 11/2000 | Ludtke | |
| 6,157,719 A * | 12/2000 | Wasilewski et al. | 380/210 |
| 6,178,242 B1 * | 1/2001 | Tsuria | 380/201 |
| 6,181,334 B1 | 1/2001 | Freeman et al. | |
| 6,185,369 B1 | 2/2001 | Ko et al. | 386/125 |
| 6,185,546 B1 | 2/2001 | Davis | |
| 6,189,096 B1 | 2/2001 | Haverty | |
| 6,192,131 B1 | 2/2001 | Geer, Jr. et al. | |
| 6,199,053 B1 | 3/2001 | Herbert et al. | |
| 6,202,151 B1 * | 3/2001 | Musgrave et al. | 713/186 |
| 6,204,843 B1 | 3/2001 | Freeman et al. | 345/327 |
| 6,209,098 B1 | 3/2001 | Davis | |
| 6,215,484 B1 | 4/2001 | Freeman et al. | 345/327 |
| 6,222,924 B1 | 4/2001 | Salomaki | |
| 6,223,290 B1 | 4/2001 | Larsen et al. | |
| 6,226,618 B1 | 5/2001 | Downs | |
| 6,229,895 B1 | 5/2001 | Son et al. | 380/200 |
| 6,230,194 B1 | 5/2001 | Frailong et al. | |
| 6,230,266 B1 | 5/2001 | Perlman et al. | |
| 6,233,577 B1 | 5/2001 | Ramasubramani et al. | |
| 6,236,727 B1 | 5/2001 | Ciacelli et al. | |
| 6,240,553 B1 | 5/2001 | Son et al. | 725/95 |
| 6,246,720 B1 | 6/2001 | Kutner et al. | |
| 6,247,127 B1 | 6/2001 | Vandergeest | 713/100 |
| 6,256,747 B1 | 7/2001 | Inohara et al. | |
| 6,263,506 B1 | 7/2001 | Ezaki et al. | |
| 6,266,416 B1 | 7/2001 | Sigbjornsen et al. | |
| 6,266,480 B1 | 7/2001 | Ezaki et al. | |
| 6,272,538 B1 | 8/2001 | Holden et al. | |
| 6,278,783 B1 | 8/2001 | Kocher et al. | |
| 6,289,455 B1 | 9/2001 | Kocher et al. | |
| 6,292,568 B1 | 9/2001 | Akins et al. | 380/239 |
| 6,292,892 B1 | 9/2001 | Davis | |
| 6,307,939 B1 | 10/2001 | Vigarie | 380/210 |
| 6,311,012 B1 | 10/2001 | Cho et al. | 386/98 |
| 6,324,288 B1 | 11/2001 | Hoffman | |
| 6,330,672 B1 | 12/2001 | Shur | 713/176 |
| 6,351,538 B1 | 2/2002 | Uz | |
| 6,351,813 B1 | 2/2002 | Mooney et al. | |
| 6,377,589 B1 | 4/2002 | Knight et al. | |
| 6,378,130 B1 | 4/2002 | Adams | 725/95 |
| 6,389,533 B1 | 5/2002 | Davis et al. | |
| 6,389,537 B1 | 5/2002 | Davis et al. | |
| 6,408,390 B1 | 6/2002 | Saito | |
| 6,415,031 B1 | 7/2002 | Colligan et al. | 380/200 |
| 6,415,101 B1 | 7/2002 | deCarmo et al. | 386/105 |
| 6,418,169 B1 | 7/2002 | Datari | |
| 6,424,717 B1 | 7/2002 | Pinder et al. | |
| 6,430,361 B2 | 8/2002 | Lee | 386/98 |
| 6,442,689 B1 | 8/2002 | Kocher | |
| 6,445,738 B1 | 9/2002 | Zdepski et al. | |
| 6,449,718 B1 | 9/2002 | Rucklidge et al. | 713/168 |
| 6,452,923 B1 | 9/2002 | Gerszberg et al. | |
| 6,453,115 B1 | 9/2002 | Boyle | |
| 6,456,985 B1 | 9/2002 | Ohtsuka | |
| 6,459,427 B1 | 10/2002 | Mao et al. | 345/327 |
| 6,463,152 B1 | 10/2002 | Takahashi | 380/201 |
| 6,466,671 B1 | 10/2002 | Maillard et al. | |
| 6,477,649 B2 | 11/2002 | Kambayashi et al. | |
| 6,505,032 B1 | 1/2003 | McCorkle et al. | 455/41 |
| 6,510,554 B1 | 1/2003 | Gordon et al. | 725/90 |
| 6,519,693 B1 | 2/2003 | Debey | |
| 6,526,144 B2 | 2/2003 | Markandey et al. | |
| 6,529,526 B1 | 3/2003 | Schneidewend | |
| 6,543,053 B1 | 4/2003 | Li et al. | 725/88 |
| 6,549,229 B1 | 4/2003 | Kirby et al. | |
| 6,550,008 B1 | 4/2003 | Zhang et al. | |
| 6,557,031 B1 | 4/2003 | Mimura et al. | |
| 6,587,561 B1 | 7/2003 | Sered et al. | 380/241 |
| 6,590,979 B1 | 7/2003 | Ryan | |
| 6,609,039 B1 | 8/2003 | Schoen | 700/94 |
| 6,640,145 B2 | 10/2003 | Hoffberg et al. | 700/83 |
| 6,640,305 B2 | 10/2003 | Kocher et al. | |
| 6,643,298 B1 | 11/2003 | Brunheroto et al. | |
| 6,650,754 B2 | 11/2003 | Akiyama et al. | |
| 6,654,389 B1 | 11/2003 | Brunheroto et al. | |
| 6,678,740 B1 | 1/2004 | Rakib et al. | 9/247 |
| 6,681,326 B2 | 1/2004 | Son et al. | 713/150 |
| 6,697,489 B1 | 2/2004 | Candelore | |
| 6,697,944 B1 | 2/2004 | Jones et al. | |
| 6,707,696 B1 | 3/2004 | Turner et al. | |
| 6,714,650 B1 | 3/2004 | Maillard et al. | |
| 6,754,276 B1 | 6/2004 | Harumoto et al. | |
| 6,772,340 B1 | 8/2004 | Peinado et al. | |
| 6,788,690 B2 | 9/2004 | Harri | |
| 6,788,882 B1 | 9/2004 | Geer et al. | |
| 6,826,185 B1 | 11/2004 | Montanaro et al. | |
| 6,834,110 B1 | 12/2004 | Marconcini et al. | |
| 6,895,128 B2 | 5/2005 | Bohnenkamp | |
| 6,904,520 B1 | 6/2005 | Rosset et al. | |
| 6,917,684 B1 | 7/2005 | Tatebayashi et al. | |
| 6,938,162 B1 | 8/2005 | Nagai et al. | |
| 6,976,166 B2 | 12/2005 | Herley et al. | |
| 7,039,802 B1 | 5/2006 | Eskicioglu et al. | |
| 7,039,938 B2 | 5/2006 | Candelore | |
| 7,058,806 B2 | 6/2006 | Smeets et al. | |
| 7,065,213 B2 | 6/2006 | Pinder | |
| 7,120,250 B2 | 10/2006 | Candelore | |
| 7,124,303 B2 | 10/2006 | Candelore et al. | |
| 7,127,619 B2 | 10/2006 | Unger et al. | |
| 7,139,398 B2 | 11/2006 | Candelore et al. | |
| 7,143,289 B2 * | 11/2006 | Denning et al. | 713/168 |
| 7,146,007 B1 | 12/2006 | Maruo et al. | |
| 7,151,831 B2 | 12/2006 | Candelore et al. | |
| 7,155,012 B2 | 12/2006 | Candelore et al. | |
| 7,194,092 B1 * | 3/2007 | England et al. | 380/262 |
| 7,242,766 B1 | 7/2007 | Lyle | |
| 2001/0011349 A1 | 8/2001 | Garrison | |
| 2001/0030959 A1 | 10/2001 | Ozawa et al. | |
| 2001/0036271 A1 | 11/2001 | Javed | |
| 2001/0042043 A1 | 11/2001 | Shear et al. | |
| 2002/0003881 A1 | 1/2002 | Reitmeier et al. | |
| 2002/0021805 A1 | 2/2002 | Schumann et al. | |
| 2002/0026587 A1 | 2/2002 | Talstra et al. | |
| 2002/0044658 A1 * | 4/2002 | Wasilewski et al. | 380/239 |
| 2002/0046406 A1 | 4/2002 | Chelehmal et al. | 725/87 |
| 2002/0047915 A1 | 4/2002 | Misu | |
| 2002/0059425 A1 | 5/2002 | Belfiore et al. | 709/226 |
| 2002/0066101 A1 | 5/2002 | Gordon et al. | |
| 2002/0083438 A1 | 6/2002 | So et al. | |
| 2002/0083439 A1 | 6/2002 | Eldering | |
| 2002/0090090 A1 | 7/2002 | Van Rijnsoever et al. | |
| 2002/0094084 A1 | 7/2002 | Wasilewski et al. | |
| 2002/0097322 A1 | 7/2002 | Monroe et al. | |
| 2002/0108035 A1 | 8/2002 | Herley et al. | 713/165 |
| 2002/0109707 A1 | 8/2002 | Lao et al. | |
| 2002/0116705 A1 | 8/2002 | Perlman et al. | |
| 2002/0120838 A1 * | 8/2002 | Abdulkader | 713/153 |
| 2002/0126890 A1 | 9/2002 | Katayama et al. | |
| 2002/0129243 A1 | 9/2002 | Nanjundiah | 713/160 |
| 2002/0150239 A1 | 10/2002 | Carny et al. | |
| 2002/0164022 A1 | 11/2002 | Strasser et al. | |
| 2002/0170053 A1 | 11/2002 | Peterka et al. | |
| 2002/0184506 A1 | 12/2002 | Perlman | |

(56) References Cited

U.S. PATENT DOCUMENTS

| | | | |
|---|---|---|---|
| 2002/0194613 A1 | 12/2002 | Unger | 725/118 |
| 2002/0196939 A1 | 12/2002 | Unger et al. | 380/216 |
| 2003/0009669 A1 | 1/2003 | White et al. | |
| 2003/0021412 A1 | 1/2003 | Candelore et al. | 380/217 |
| 2003/0026423 A1 | 2/2003 | Unger et al. | 380/217 |
| 2003/0026523 A1 | 2/2003 | Chua et al. | |
| 2003/0035540 A1 | 2/2003 | Freeman et al. | |
| 2003/0035543 A1 | 2/2003 | Gillon et al. | |
| 2003/0046686 A1 | 3/2003 | Candelore et al. | 725/31 |
| 2003/0059047 A1 | 3/2003 | Iwamura | |
| 2003/0063615 A1 | 4/2003 | Iuoma et al. | 370/401 |
| 2003/0072555 A1 | 4/2003 | Yap et al. | |
| 2003/0078891 A1* | 4/2003 | Capitant | 705/57 |
| 2003/0081630 A1 | 5/2003 | Mowery et al. | 370/466 |
| 2003/0081776 A1 | 5/2003 | Candelore | 380/200 |
| 2003/0084284 A1 | 5/2003 | Ando et al. | |
| 2003/0097662 A1 | 5/2003 | Russ et al. | |
| 2003/0108199 A1 | 6/2003 | Pinder et al. | |
| 2003/0123664 A1 | 7/2003 | Pedlow, Jr. et al. | 380/218 |
| 2003/0123849 A1 | 7/2003 | Nallur et al. | 386/68 |
| 2003/0133570 A1 | 7/2003 | Candelore et al. | 380/210 |
| 2003/0145329 A1 | 7/2003 | Candelore | 725/87 |
| 2003/0152224 A1 | 8/2003 | Candelore et al. | 380/210 |
| 2003/0152226 A1 | 8/2003 | Candelore et al. | 380/218 |
| 2003/0156718 A1 | 8/2003 | Candelore et al. | 380/211 |
| 2003/0159139 A1 | 8/2003 | Candelore et al. | 725/25 |
| 2003/0159140 A1 | 8/2003 | Candelore | 725/31 |
| 2003/0159152 A1 | 8/2003 | Lin et al. | 725/87 |
| 2003/0174837 A1 | 9/2003 | Candelore et al. | 380/210 |
| 2003/0174844 A1 | 9/2003 | Candelore | |
| 2003/0188164 A1 | 10/2003 | Okimoto et al. | |
| 2003/0190054 A1 | 10/2003 | Troyansky et al. | |
| 2003/0198223 A1 | 10/2003 | Mack et al. | 370/392 |
| 2003/0204717 A1 | 10/2003 | Kuehnel | |
| 2003/0222994 A1 | 12/2003 | Dawson | |
| 2003/0226149 A1 | 12/2003 | Chun et al. | 725/78 |
| 2004/0003008 A1 | 1/2004 | Wasilewski et al. | 707/200 |
| 2004/0021764 A1 | 2/2004 | Driscoll, Jr. et al. | |
| 2004/0037421 A1 | 2/2004 | Truman | |
| 2004/0047470 A1 | 3/2004 | Candelore | 380/240 |
| 2004/0049688 A1 | 3/2004 | Candelore et al. | 713/191 |
| 2004/0049690 A1 | 3/2004 | Candelore et al. | 713/193 |
| 2004/0049691 A1 | 3/2004 | Candelore et al. | 713/193 |
| 2004/0049694 A1 | 3/2004 | Candelore | 713/200 |
| 2004/0064688 A1 | 4/2004 | Jacobs | |
| 2004/0073917 A1 | 4/2004 | Pedlow, Jr. et al. | |
| 2004/0078575 A1 | 4/2004 | Morten et al. | 713/176 |
| 2004/0086127 A1 | 5/2004 | Candelore | |
| 2004/0088541 A1 | 5/2004 | Messerges et al. | |
| 2004/0088552 A1 | 5/2004 | Candelore | |
| 2004/0088558 A1 | 5/2004 | Candelore | |
| 2004/0093494 A1* | 5/2004 | Nishimoto et al. | 713/165 |
| 2004/0100510 A1 | 5/2004 | Milic-Frayling et al. | |
| 2004/0111613 A1* | 6/2004 | Shen-Orr et al. | 713/165 |
| 2004/0123094 A1 | 6/2004 | Sprunk | |
| 2004/0136532 A1 | 7/2004 | Pinder et al. | |
| 2004/0139337 A1 | 7/2004 | Pinder et al. | |
| 2004/0141314 A1 | 7/2004 | Vautrin et al. | |
| 2004/0158721 A1 | 8/2004 | Candelore | |
| 2004/0165586 A1 | 8/2004 | Read et al. | 370/389 |
| 2004/0181666 A1 | 9/2004 | Candelore | |
| 2004/0187161 A1 | 9/2004 | Cao | 725/110 |
| 2004/0240668 A1 | 12/2004 | Bonan et al. | |
| 2004/0267602 A1 | 12/2004 | Gaydos et al. | |
| 2005/0004875 A1* | 1/2005 | Kontio et al. | 705/52 |
| 2005/0021941 A1* | 1/2005 | Ohmori et al. | 713/156 |
| 2005/0028193 A1 | 2/2005 | Candelore et al. | |
| 2005/0036067 A1 | 2/2005 | Ryal et al. | |
| 2005/0066357 A1 | 3/2005 | Ryal | |
| 2005/0094808 A1 | 5/2005 | Pedlow, Jr. et al. | |
| 2005/0094809 A1 | 5/2005 | Pedlow, Jr. et al. | |
| 2005/0097596 A1 | 5/2005 | Pedlow, Jr. | |
| 2005/0097597 A1 | 5/2005 | Pedlow, Jr. et al. | |
| 2005/0097598 A1 | 5/2005 | Pedlow, Jr. et al. | |
| 2005/0097614 A1 | 5/2005 | Pedlow, Jr. et al. | |
| 2005/0102702 A1 | 5/2005 | Candelore et al. | |
| 2005/0129233 A1 | 6/2005 | Pedlow, Jr. | |
| 2005/0141713 A1 | 6/2005 | Genevois | |
| 2005/0144646 A1* | 6/2005 | Lecrom et al. | 725/100 |
| 2005/0169473 A1 | 8/2005 | Candelore | |
| 2005/0192904 A1 | 9/2005 | Candelore | |
| 2006/0026926 A1 | 2/2006 | Triel et al. | |
| 2006/0029060 A1 | 2/2006 | Pister | |
| 2006/0115083 A1 | 6/2006 | Candelore et al. | |
| 2006/0130119 A1 | 6/2006 | Candelore et al. | |
| 2006/0130121 A1 | 6/2006 | Candelore et al. | |
| 2006/0136976 A1 | 6/2006 | Coupe et al. | |
| 2006/0153379 A1 | 7/2006 | Candelore et al. | |
| 2006/0168616 A1 | 7/2006 | Candelore | |
| 2006/0174264 A1 | 8/2006 | Candelore | |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 440 | 9/1995 |
| EP | 0 674 441 | 9/1995 |
| EP | 0720374 | 7/1996 |
| EP | 0382764 | 4/1997 |
| EP | 0833517 | 4/1998 |
| EP | 0866615 | 9/1998 |
| EP | 1187483 | 3/2002 |
| JP | 07-046575 | 2/1995 |
| JP | 7067028 | 3/1995 |
| JP | 10164052 A | 6/1998 |
| JP | 11159162 | 6/1999 |
| JP | 11331805 A | 11/1999 |
| JP | 11243534 | 10/2002 |
| JP | 2002540736 | 11/2002 |
| JP | 2003518841 A | 6/2003 |
| JP | 2003330897 | 11/2003 |
| JP | 2008514123 A | 5/2008 |
| WO | WO 86/07224 | 12/1986 |
| WO | WO8607224 | 12/1986 |
| WO | WO-8902682 | 3/1989 |
| WO | WO-93/09525 | 5/1993 |
| WO | WO-94/10775 | 5/1994 |
| WO | WO9738530 | 10/1997 |
| WO | WO00/31964 | 6/2000 |
| WO | WO0051039 | 8/2000 |
| WO | WO-00/59203 | 10/2000 |
| WO | WO 01 11819 | 2/2001 |
| WO | WO-01/26372 | 4/2001 |
| WO | WO 01/65762 A2 | 9/2001 |
| WO | WO01/78386 | 10/2001 |
| WO | WO-2004042516 | 5/2004 |
| WO | WO-2004042995 A1 | 5/2004 |

OTHER PUBLICATIONS

"Ad Agencies and Advertisers to be Empowered with Targeted Ad Delivered by Television's Prevailing Video Servers", *Article Business Section of The New York Times*, (Dec. 20, 2001).

"CLearPlay: The Technology of Choice", from web site, http://www.clearplay.com/what.asp, ClearPlay 2001-2003.

"McCormac Hack Over Cablemodem", *HackWatch*, http://www.hackwatch.com/cablemodbook.html, (Aug. 10, 1998).

"Message Authentication with Partial Encryption", *Research disclosure RD* 296086, (Dec. 10, 1988).

"Metro Media PVR-DVD-MP3-Web", Internet publication from www.metrolink.com, (undated).

"New Digital Copy protection Proposal Would Secure Authorized Copies", *PR Newswire*, (Nov. 13, 1998),1-3.

"Passage Freedom to Choose", *Sony Electronics Inc.*, (2003).

"Pre-Encryption Profiles—Concept Overview and Proposal", *Rev. 1.2 as submitted to the Open CAS consortium on Dec. 28, 2000.*, (Dec. 28, 2000).

Agi, Iskender , et al., "An Empirical Study of Secure MPEG Video Transmissions", *IEEE, Proceedings of SNDSS 96*, (1996), 137-144.

(56) References Cited

OTHER PUBLICATIONS

Alattar, Adnan, et al., "Evaluation of Selective Encryption Techniques for Secure Transmission of MPEG-Compressed Bit-Streams", *IEEE* (1999),IV-340 to IV-343.
Alattar, Adnan M., et al., "Improved Selective Encryption Techniques for Secure Transmission of MPEG Video Bit-Streams", *IEEE*, (1999),256-260.
Aravind, H., et al., "Image and Video Coding Standards", *AT&T Technical Journal*, (Jan./Feb. 1993),67-68.
Dittmann, Jana, et al., "Multimedia and Security Workshop at ACM Multimedia", Bristol, U.K., (Sep. 1998).
Dondeti, Lakshminath R., et al., "A Dual Encryption Protocol for Scalable Secure Multicasting", *1999 International Symposium on Computers and Communication*, Jul. 6-8, 1999.
Gonzalez, R. C., et al., "Digital Image Processing", *Addison Wesley Publishing Company, Inc.*, (1992),346-348.
Gulwani, Sumit, "A Report on Security Issues in Multimedia", *Department of Computer Science and Engineering, Indian Institute of Technology Kanpur*, Course Notes,(Apr. 30, 2000),pp. 10-14.
Haberman, Seth, "Visible World—A High Impact Approach to Customized Television Advertising", (Dec. 2001).
Kim, et al., "Bit Rate Reduction Algorithm for a Digital VCR", *IEEE Transactions on Consumer Electronics*, vol. 37, No. 3, (Aug. 1, 1992),267-274.
Koenen, Rob H., et al., "The Long March To Interoperable Digital Rights Management", *IEEE*, (2004),1-17.
Kondo, et al., "A New Concealment Method for Digital VCRs", *IEEE Visual Signal Processing and Communication*, Melbourne, Australia, Sep. 1993,20-22.
Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", *Sony Corporation*, (1991).
Kunkelmann, Thomas, "Applying Encryption to Video Communication", *Multimedia and Security Workshop at ACM Multimedia ?98*. Bristol, U.K., (Sep. 1998),41-47.
Lookabaugh, Tom, et al., "Selective Encryption and MPEG-2", *ACM Multimedia '03*, (Nov. 2003).
Menezes, Alfred J., et al., "Handbook of Applied Cryptography", *CRC Press*, 551-553.
Naor, Moni, et al., "Certificate Revocation and Certificate update" Apr. 2000, *IEEE Journal on Selected Areas in Communications, IEEE*, vol. 18, No. 4, (2000),561-570.
NHK Laboratories Note, "Error Correction, Concealment and Shuffling", No. 424 (Mar. 1994),29-44.
Park, et al., "A Simple Concealment for ATM Bursty Cell Loss", *IEEE Transactions on Consumer Electronics*, No. 3, (Aug. 1993),704-709.
Park, Joon S., et al., "Binding Identities and Attributes Using Digitally Singed Certificates", *IEEE*, (2000).
Piazza, Peter, "E-Signed, Sealed, and Delivered", *Security Management*, vol. 45. No. 4, (Apr. 2001)72-77.
Qiao, Lintian, et al., "Comparison of MPEG Encryption Algorithms", *Department of Computer Science, University of Illinois at Urbana-Champaign*, (Jan. 17, 1998),1-20.
Robert, Arnaud, et al., "Digital Cable: The Key to Your Content", *Access Intelligence's Cable Group*, online at http:www.cableworld. com/ct/archives/0202/0202digitalrights.htm, (Feb. 2002).
Rosenblatt, Bill, "Coral Consortium Aims to Make DRM Interoperable", online at http://www.drmwatch.com/standards/article.php/3418741, (Oct. 4, 2004).
Seachange International, "Dynamic-Customized TV Advertising Creation and Production Tools", *Web Site Literature*.
Seachange International, "Transport Streams Insertion of Video in the Compressed Digital Domain", *Web Site Literature*, (2000).
Shavik, Kirstnamurthy, "Securant Technologies Delivers Broad PKI Integration to Enable Standards Based Security", *Business Wires*, (Oct. 4, 1999).
Shi, Changgui, et al., "An Efficient MPEG Video Encryption Algorithm", 1998 *IEEE*, Department of Computer Sciences, Purdue University, West Lafayette. IN, 381-386.
Spanos, George A., et al., "Performance Study of a Selective Encryption Scheme for the Security of Networked, Real-Time Video", *IEEE*, (1995),2-10.
Taylor, Jim, "DVD Demystified—The Guidebook for DVD-Video and DVD-ROM", *Pub. McGraw-Hill*, ISBN: 0-07-064841-7, pp. 134-147, (1998),134-147.
Tom, et al., "Packet Video for Cell Loss Protection Using Deinterleaving and Scrambling", *ICASSP 91: 1991 International Conference on Acoustics, Speech and Signal Processing*, vol. 4, (Apr. 1991), 2857-2860.
Wu, Chung-Ping, et al., "Fast Encryption Methods for Audiovisual Data Confidentiality", *SPIE International Symposia on Information Technologies*,(Boston, Ma., USA), (Nov. 2000),284-295.
Wu, S. Felix, et al., "Run-Time Performance Evaluation for a Secure MPEG System Supporting Both Selective Watermarking and Encryption", submitted to JSAC special issue on Copyright and Privacy Protection, (Mar. 1, 1997).
Wu, Tsung-Li, et al., "Selective Encryption and Watermarking of MPEG Video (Extended Abstract)", *International Conference on Image Science, Systems, and Technology*, CISST?97, (Feb. 17, 1997).
Zeng, Wenjun, et al., "Efficient Frequency Domain Video Scrambling for Content Access Control", in *Proc. ACM Multimedia*, (Nov. 1999).
Zhu, et al., "Coding and Cell-Loss Recovery in DCT-Based Packet Video", *IEEE Transactions on Circuits and Systems for Video Technology*, No. 3, NY,(Jun. 3, 1993).
Brown, Jessica, "The Interactive Commercial, Coming Soon to a TV Near You".
Dittmann, Jana, et al., "Multimedia and Security Workshop at ACM Multimedia", Bristol, U.K (Sep. 1998).
Liu, Zheng, et al., "Motion Vector Encryption in Multimedia Streaming", *Proccedings of the 10th International Multimedia Modeling Conference 2004 IEEE*, (2004),1-8.
Ncube, "Digital Program Insertion", (May 2001).
Ncube, "Smooth Ad Insertion Deployment Protects Revenues", (2004).
OpenTV, "OpenTV to Showcase Several Advanced Interactive Television Solutions at IBC 2004", (Sep. 6, 2004).
Pazarci, Melih, et al., "Data Embedding in Scrambled Digital Video", *Computers and Communication Proceedings, Eighth IEEE International Symposium on 2003*, vol. 1 (*ISCC 2003*, (2003),498-503.
Thawani, Amit, et al., "Context Aware Personalized Ad Insertion in an Interactive TV Environment".
"How Networks Work, Millennium Edition", *Que Corporation*(Sep. 2000),88-89.
"MPEG-2 Digital Broadcast Pocket Guide", vol. 6 Revised, *Aeterna, LLC.*, Germantown, Maryland USA., (2001), 1-59.
U.S. Appl. No. 10/690,192 Office Action mailed Sep. 24, 2008.
U.S. Appl. No. 10/690,192 Office Action mailed Mar. 4, 2009.
PCT Internal Search Report and Written Opinion, International Application No. PCT/US05/31171, mailed Oct. 26, 2006.
PCT Internal Search Report, International Application No. PCT/US00/0511 mailed Apr. 7, 2000.
U.S. Appl. No. 10/388,002 Office Action mailed May 6, 2008.
U.S. Appl. No. 10/388,002 Office Action mailed Nov. 19, 2008.
Japanese Patent Application No. 2007-536692 Preliminary Notice of Grounds for Refusal dated Apr. 25, 2011.
European Patent Application No. 03 786 590.4-2223 dated Apr. 7, 2011.

* cited by examiner

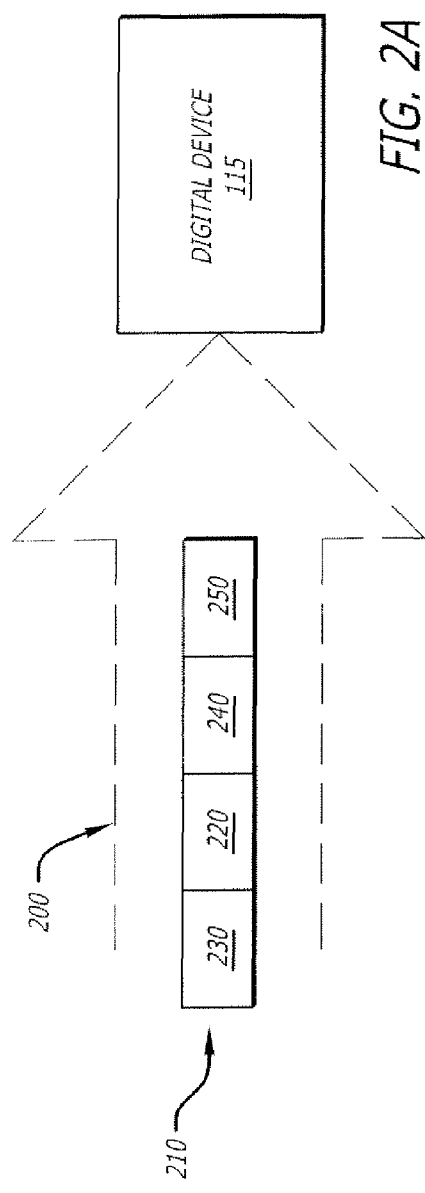
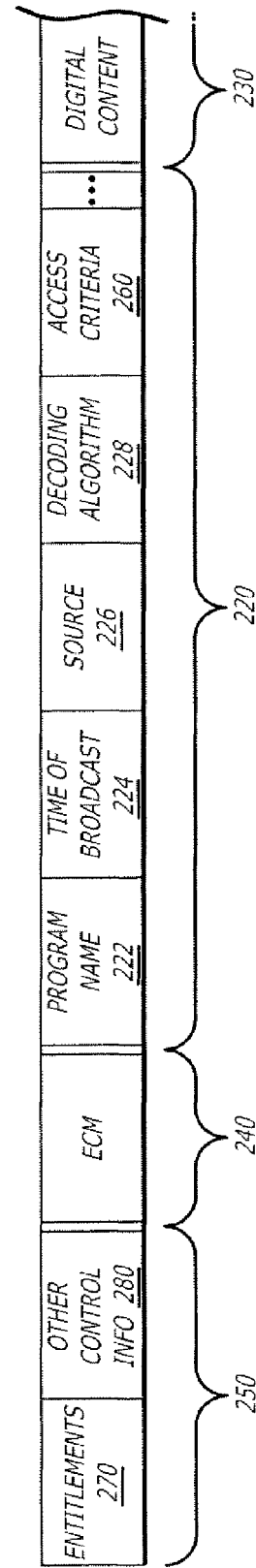
FIG. 2A
FIG. 2B

DIGITAL RIGHTS MANAGEMENT OF A DIGITAL DEVICE

CROSS-REFERENCE TO RELATED APPLICATIONS

The application is a Continuation-in-Part of Ser. No. 10/388,002 filed Mar. 12, 2003 now U.S. Pat. No. 7,724,907 which claims benefit of U.S. Provisional Application No. 60/424,381 filed Nov. 5, 2002 and U.S. Provisional Application No. 60/558,386 filed Mar. 31, 2004.

BACKGROUND

1. Field

Embodiments of the invention relate to digital communications. More specifically, one embodiment of the invention relates to a system, apparatus and method for digital rights management using one-time programmable keys.

2. General Background

Analog communication systems are rapidly giving way to their digital counterparts. Similarly, the explosive growth of the Internet and the World Wide Web have resulted in an increase of downloadable audio-visual files, such as video files, MP3-formatted audio files, and other digital content.

Simultaneously with, and in part due to this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts.

The combination of movement towards digital communication systems and digital recording devices poses a concern to content owners such as the motion picture and music industries, who are reluctant in providing downloadable digital content due to fears of unauthorized and uncontrolled copying such digital content. In response, digital rights management schemes have been deployed into set-top boxes that receive digital content from providers of such content.

"Digital Rights Management" (DRM) is a mechanism for ensuring that digital content is properly handled in accordance with the rights granted by either a content owner or a content provider. Previously, DRMs were configured to perform simple conditional access to broadcast content. This processing was accomplished by a cryptographic coprocessor or peripheral hardware such as a smart card operating in cooperation with the main central processing unit (CPU). While this configuration may have provided secure delivery of the digital content to the subscriber, it suffered from the cost of a separate security circuit, failed to fully ensure security of the digital content after delivery, and was difficult to reprogram for new rules imposed by the content owner or content provider. Modern set-top boxes can now store content for future viewing, and they can network content to other devices through digital interfaces, e.g. Ethernet, IEEE 1394 or HDMI. The rules for handling content have grown as a result. It would be desirable to flexibility and dynamically address content handling rules as they evolve while maintaining cost effective security of decryption keys.

BRIEF DESCRIPTION OF THE DRAWINGS

Embodiments of the invention are illustrated by way of example and not by way of limitation in the accompanying drawings, in which like references indicate similar elements and in which:

FIGS. 2A & 2B are exemplary embodiments of the data structure associated with incoming information received by a digital device of the subscriber terminal device of FIG. 1;

DETAILED DESCRIPTION

Various embodiments of the invention relate to an apparatus, system and method for controlling entitlements concerning digital content received from a content provider. Examples of a "content provider" include, but are not limited to a terrestrial broadcaster, cable operator, direct broadcast satellite (DBS) company, a company providing content for download via the Internet, or other source of content. Such control is provided by digital rights management logic loaded within a subscriber terminal device and separate from, but operating in cooperation with key generation logic.

More specifically, the digital rights management logic functions separate from key generation, which is conducted internally by the descrambler. The DRM is executed by the main processor of the subscriber terminal device. Updates to the DRM can be downloaded to the subscriber terminal device. Key generation is conducted by the descrambler, which can be non-processor based hardware, and therefore, fully independent of the DRM functionality and eliminating the need for a separate cryptographic processor. This approach maintains a higher level of security over the content than software only approach that attempt to handle both DRM and key generation because hardware based security is often more difficult to probe and reverse engineer.

In the following description, certain terminology is used to describe features of the invention. For instance, the terms "component" or "logic" are each representative of hardware and/or software configured to perform one or more functions. Examples of "hardware" include, but are not limited or restricted to an integrated circuit such as a processor (e.g., microprocessor, application specific integrated circuit, a digital signal processor, a micro-controller, etc.), finite state machine, combinatorial logic or the like.

An example of "software" includes a series of executable instructions in the form of an application, an applet, a routine or sub-routine. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

Herein, the term "process block" represents hardware and/or software having a dedicated function, such as decryption, encryption, hashing or the like.

Figure 1:
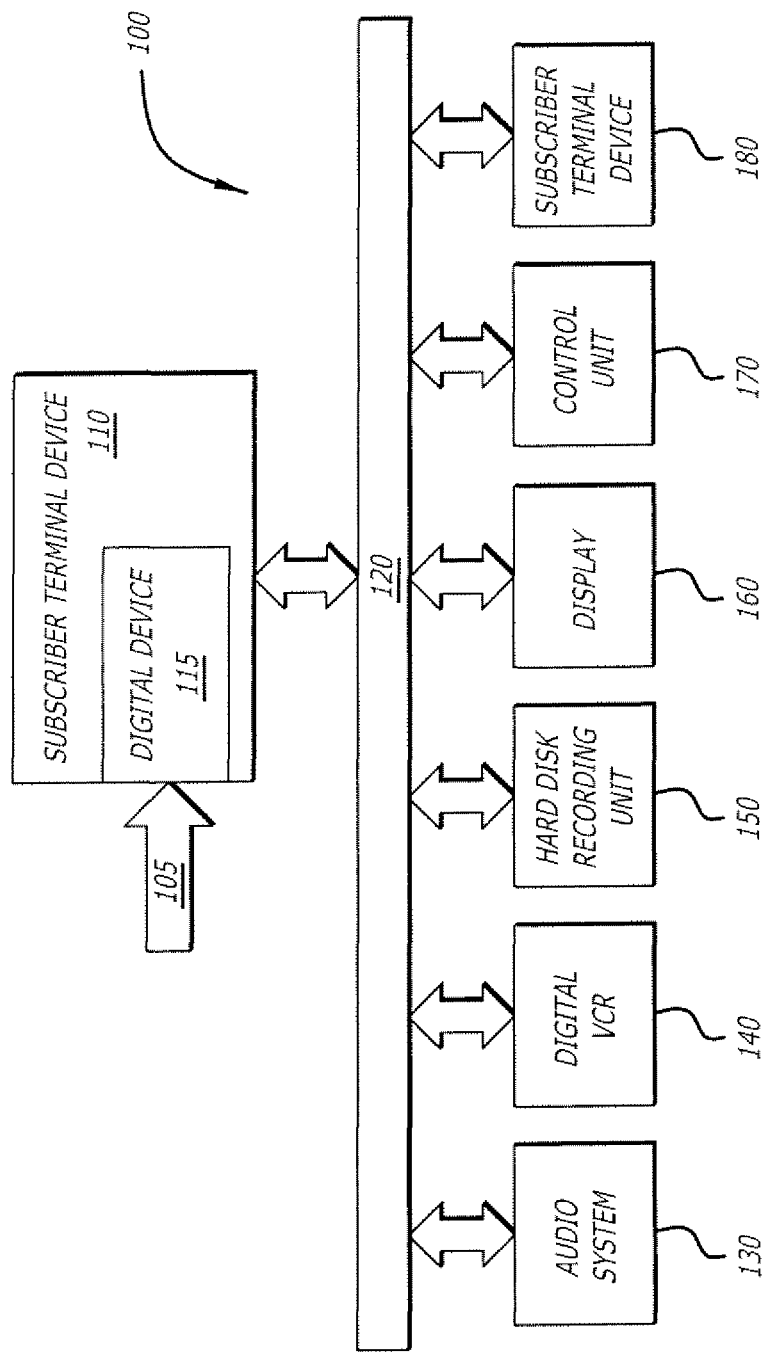
FIG. 1 is a first exemplary embodiment of a content delivery system including a subscriber terminal device.

Referring to FIG. 1, an exemplary embodiment of a content delivery system 100 is shown. Content delivery system 100 includes a subscriber terminal device 110 that receives information including program data from one or more content providers over a first transmission medium 105 (e.g., electrical wire, optical fiber, cable, wireless signaling circuitry, etc.). The program data may be propagated as a digital bit stream for example. Subscriber terminal device 110 may operate as any number of products such as a set-top box or one or more components integrated into a television, computer, audio-playback device (e.g., digital radio), audio-recording device (e.g., MP3 player), video-recording device (e.g., digital recorder), or the like.

According to one embodiment of the invention, subscriber terminal device 110 may be configured in accordance with an embedded architecture, where subscriber terminal device 110 is implemented as a set-top box that comprises fixed, internal logic supporting both digital rights management (DRM) and descrambling operations. This internal logic is identified as a digital device 115.

When implemented as a set-top box, subscriber terminal device 110 may be coupled to other components in content delivery system 100 via a second transmission medium 120. Second transmission medium 120 operates to transmit program data between subscriber terminal device 110 and other components in content delivery system 100.

Depending on the type of product corresponding to subscriber terminal device 110, content delivery system 100 may include one or more of the following components: an audio system 130, a digital VCR 140, a hard disk recording unit 150, a display 160, a control unit 170 and a secondary subscriber terminal device 180.

Herein, as shown, audio system 130 provides audio playback and storage capabilities when the program data includes audio files. Digital VCR 140, such as a D-VHS VCR, and hard disk recording unit 150 provides recording and playback of program data. Audio system 130, digital VCR 140 and hard disk recording unit 150 are in communication with subscriber terminal device 110 and other components of content delivery system 100, such as display 160, control unit 170 and secondary subscriber terminal device 180, via second transmission medium 120.

Display 160 may include a high definition television display, a monitor, or another device capable of processing digital video signals. Control unit 170 may be in communication with second transmission medium 120. Control unit 170 may be used to coordinate and control the operation of some or each of the components on content delivery system 100.

Secondary subscriber terminal device 180 may be part of a home entertainment network that supports the retransmission of data to a variety of components placed throughout a home, business or any other facility.

Although subscriber terminal device 110 is configured in accordance with an embedded architecture so as to include digital device 115 with DRM functionality, it is contemplated that subscriber terminal device 110 may be configured in accordance with a split security architecture. Herein, subscriber terminal device 110 may be adapted to receive a removable smart card with the digital device 115 deployed thereon.

As shown in FIG. 2A, subscriber terminal device 110 comprises digital device 115, which processes incoming information 200, namely program data 210 inclusive of the digital content. The "program data" 210 comprises at least (i) system information 220 and (ii) digital content 230, namely an image, document (web page, alphanumeric text, etc.), audio, video or any combination thereof. The digital content 230 may be in a scrambled or clear format. In addition, according to one embodiment of the invention, it is contemplated that program data 210 may further comprises an Entitlement Control Message (ECM) 240 and/or an Entitlement Management Message (EMM) 250.

After being obtained, an exemplary order of data propagation as shown in FIG. 2B, system information 220 is processed. "System information" 220 may include information on program names 222, time of broadcast 224, source of content 226, requisite decoding algorithm 228, and access criteria 260. The "access criteria" 260 is information (hereinafter referred to as "access requirements") that controls digital device 115 and other components (e.g., audio system 130, digital VCR 140, hard disk recording unit 150, display 160 of FIG. 1) as to how and when digital content 230 may be replayed, retransmitted and/or recorded. In general terms, each access requirement is a restrictive parameter used to determine if subscriber terminal device 110 is authorized to perform a specified operation.

As an illustrative example, a first access requirement may indicate that digital content 230 may be replayed "X" times, where $X \geq 1$. A second access requirement may indicate that digital content 230 is pay per play (PPP) or pay per view (PPV) scrambled digital content that may be played only during a prescribed time period. A third access requirement may indicate that digital content 230 cannot be recorded ("0" times) or can be recorded "X" times.

Alternatively, it is contemplated that access criteria 260 may be transmitted along with or as part of an ECM 240, which is generally used to regulate access to a particular channel or service. ECM 240 may comprise a key (e.g. control word) to descramble incoming scrambled digital content.

EMM 250 may be used to deliver access rights (sometimes referred to as "entitlements") 270 to digital device 115. Examples of certain entitlements 270 may include, but are not limited to keys, digital certificates, access parameters directed to replay, retransmission and/or recordation features of the subscriber terminal device 110. Normally, EMM 250 is received prior to digital content 230 and may be sent in-band (as shown) or out-of-band via a side-band channel for example. These entitlements 270 may be downloaded well in advance of receipt of their corresponding digital content 230.

Of course, other control information 280 may be provided in EMM 250. For instance, control information 280 contained in EMM 250 may comprise a removable device identifier (ID), which is a bit value that is used to indicate a particular type and/or manufacturer of subscriber terminal device 110. Control information 280 of EMM 250 may comprise a length field, which is a bit value used to indicate the length of EMM 250. Control information 280 of EMM 250 may further comprise one or more key identifiers, which are multi-bit entitlement tag values that are signed for use in checking whether any key of EMM 250 has been illicitly altered.

Control information 280 of EMM 250 may further comprise one or more of the following: a Manufacturer identifier (Manufacturer ID) being a predetermined value (e.g., one or more bits such as 16-bits) that identifies a manufacturer of digital device 115; a Service Provider ID being a value that identifies the content delivery system provider as well as the selected distribution scheme (e.g., cable, satellite, terrestrial or Internet company supplying the requested program data); a Conditional Access (CA) Provider ID being a value that identifies the provider of CA control system; or a Sequence Number being used for reordering packets of information if a key is more than one packet in length, and in certain systems, may also be used to indicate expiration of various control information.

When digital content 230 in a scrambled format is received by subscriber terminal device 110, the access requirements 260 within program data 210 are compared to entitlements 270 that subscriber terminal device 110 actually has. Such comparison is accomplished within digital device 115 as described below in detail.

According to one embodiment of the invention, in order for subscriber terminal device 110 to display the scrambled content in clear form for example, access requirements 260 associated with digital content 230 are compared to entitlements 270 previously assigned to subscriber terminal device 110. The entitlements 270 may state that subscriber terminal device 110 is entitled to view/playback content from a given content provider such as Home Box Office (HBO), for example. The entitlements 270 may also include one or more keys needed to descramble the digital content. The entitlements 270 also may define time periods for which subscriber terminal device 110 may descramble digital content 230.

Thus, in one embodiment, access requirements 260 and entitlements 270 are used by a digital rights management (DRM) function to determine whether digital device 115 is authorized to view a particular program. Although this illustrative embodiment focuses on mechanisms to recover audio/visual content such as television broadcasts or purchased movies, it is contemplated that the invention is also applicable to the descrambling audio-only or image-only content only (e.g., digitized music files, digital pictures, etc.).

Figure 3:
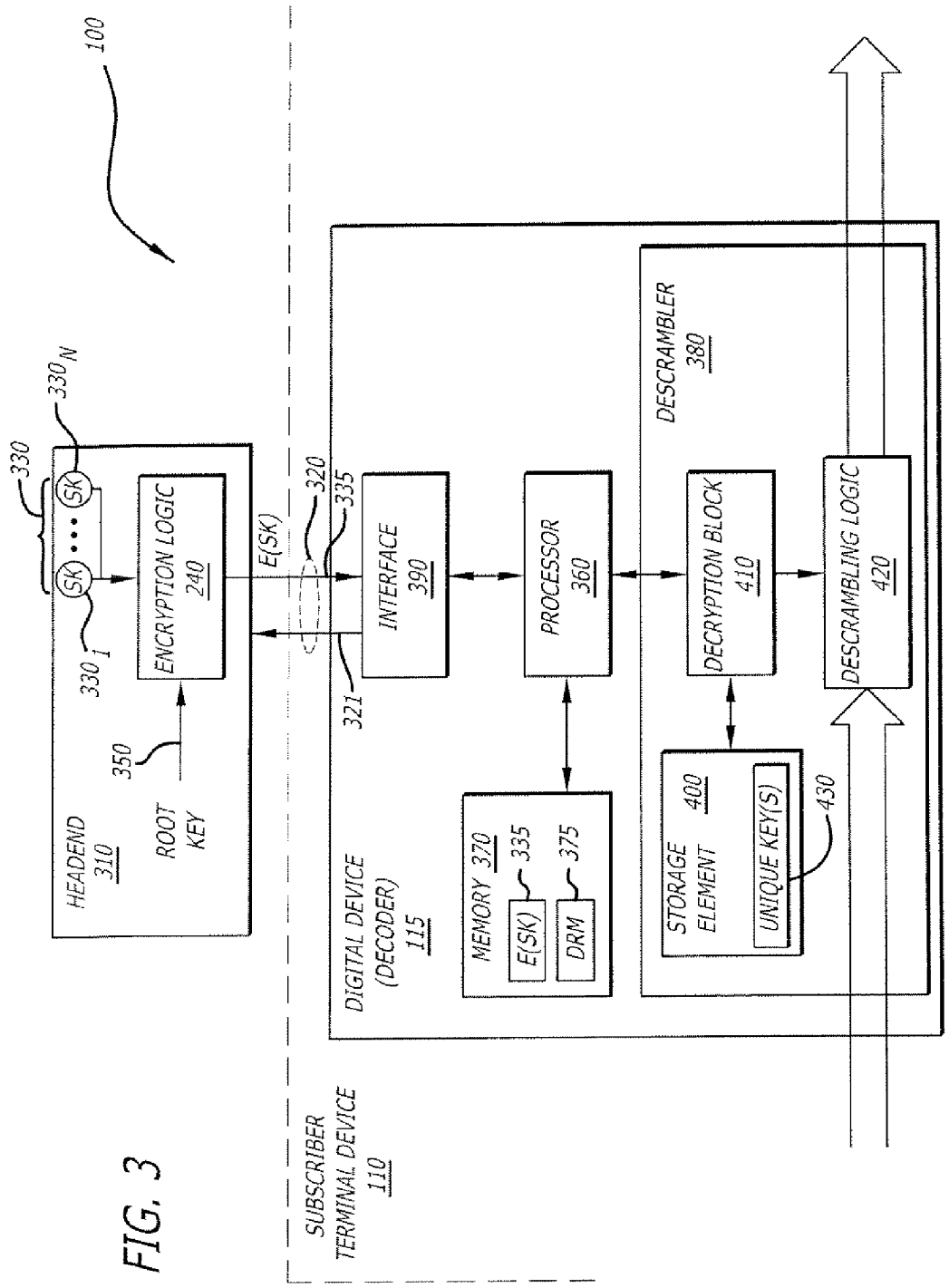
FIG. 3 is a more detailed embodiment of the content delivery system of FIG. 1 pertaining to the communications between the headend and the subscriber terminal device.

As seen in FIG. 3, a detailed exemplary embodiment of content delivery system 100 comprising a headend server ("headend") 310 in communication with subscriber terminal device 110 over a one-way or two-way network 320 is shown.

For this embodiment of the invention, it is contemplated that headend 310 maintains all entitlements for digital device 115 of subscriber terminal device 110, which operates as a decoder. It is contemplated that other embodiments for maintaining entitlements may be deployed.

Headend 310 is adapted to deliver entitlements, such as one or more (N) keys $330_1$-$330_N$ for example, encrypted by encryption logic 340 using a key 350 stored or produced within digital device 115. For instance, this key 350 is a "Root Key," which is a deterministic key based on a collection of information such as one or more keys, portion of digital content 230, a Unique Key as set forth below, or any combination thereof. For clarity, keys $330_1$-$330_N$ shall be generally referred to as "Service Key(s)" or "SK" 330. The Service Key(s) 330 are encrypted using Root Key 350 (referenced as "E(SK) 335") and are provided to subscriber terminal device 110 for local storage via network 320.

As described below, Service Key(s) 330 are stored in their encrypted form, and loaded from storage as needed. Upon loading, any one of encrypted Service Key(s) 330 is decrypted within digital device 115 by using Root Key 350 and perhaps a unique key stored in a storage element of digital device 115 as described below.

For this embodiment of the invention, digital device 115 may be implemented as a printed circuit card, multi-chip module, or even a single chip solution. Herein, digital device 115 comprises a processor 360, an optional memory 370, a descrambler 380 being an integrated circuit (IC) that handles the secure processing of incoming content, and an interface 390. Memory 370 may be used for storage of encrypted Services Key(s) 335, DRM function 375 for execution by processor 360 or the like. Therefore, memory 370 may be non-volatile, volatile or a combination of volatile and non-volatile memories.

According to one embodiment, descrambler 380 comprises a storage element 400, a decryption block 410 and descrambling logic 420. Descrambler 380 features no processor, no firmware and no software; namely it is a non-processor based descrambler. No software instructions or code is executed within descrambler 380. Cryptographic operations (e.g., decryption, hashing, etc.) are performed by decryption block 410 which, according to one embodiment of the invention, is implemented as a hardware circuit or state machine using only a single key function for decryption. According to another embodiment of the invention, decryption block 410 is implemented as a sequence of process blocks forming a key ladder arranged to produce a key (e.g., Root Key 350) to recover at least one Service Key $330_i (1 \leq i \leq N)$ for descrambling (or assist in the descrambling) of the incoming scrambled content (see FIG. 5A).

One or more unique keys 430, generally referred to as "Unique Key" 430 herein, may be programmed into storage element 400 during manufacture. For example, in one embodiment, storage element 400 implemented within descrambler 380 that can be written only once. When subscriber terminal device 110 is manufactured, storage element 400 is programmed. In this embodiment, there is no way to either improperly read or overwrite Unique Key 430 that was originally loaded into storage element 400. An association between a serial number of subscriber terminal device 110 and Unique Key 430 loaded into descrambler 380 may be recorded and subsequently made available to headend 310.

In one embodiment of the invention, Service Key(s) 330 is used as a descrambling key to descramble the content directly. In another embodiment of the invention, Service Key(s) 330 is used to decrypt one or more descrambling keys, which are received in-band with the scrambled digital content and subsequently used for descrambling purposes. Where Service Key(s) 330 feature more than one key, each key $330_1$-$330_N$ may be encrypted using different public and proprietary encryption algorithms. These different proprietary algorithms may be considered as any-piracy measures to invalidate clone hardware.

Referring still to FIG. 3, headend 310 can deliver one or more Service Keys 330 on a channel or "tier of service" basis in the EMMs. The Service Key(s) 330 is encrypted to produce E(SK) 335 and is stored locally in subscriber terminal device 110, such as within memory 370 or within on-chip memory of processor 360. This allows processor 360 to use Service Key(s) 330 as needed when tuning to different channels.

While this embodiment works in one-way (non-IPPV) broadcast networks, it also performs in two-way, interactive networks, where Service Key(s) 330 for a particular service is requested, such as IPPV or VOD purchases or any other non-subscription service. A return channel 321 is used to request a particular Service Key 330i because the ability to grant access to a new service is performed by headend 310 instead of a local controlling cryptographic processor.

In order to avoid overload problems at headend 310 caused by a large number of simultaneous impulse buys of IPPV programs, a Free Preview period can be determined and IPPV programs can be marketed in advance of the actual viewing. In this embodiment, service keys for individual shows or movies may be requested by subscriber terminal device 110 and delivered ahead of time. For example, interactive networks, such as a cable system having return channel 321 such as a DOCSIS modem or Out-of-Band transmitter/receiver for example (see FIG. 4), can deliver a Request for Program Key (RPK) message from subscriber terminal device 110 to headend 310. Alternatively, subscriber terminal device 110 may request Service Keys 330 in real-time for each program accessed.

Figure 4:
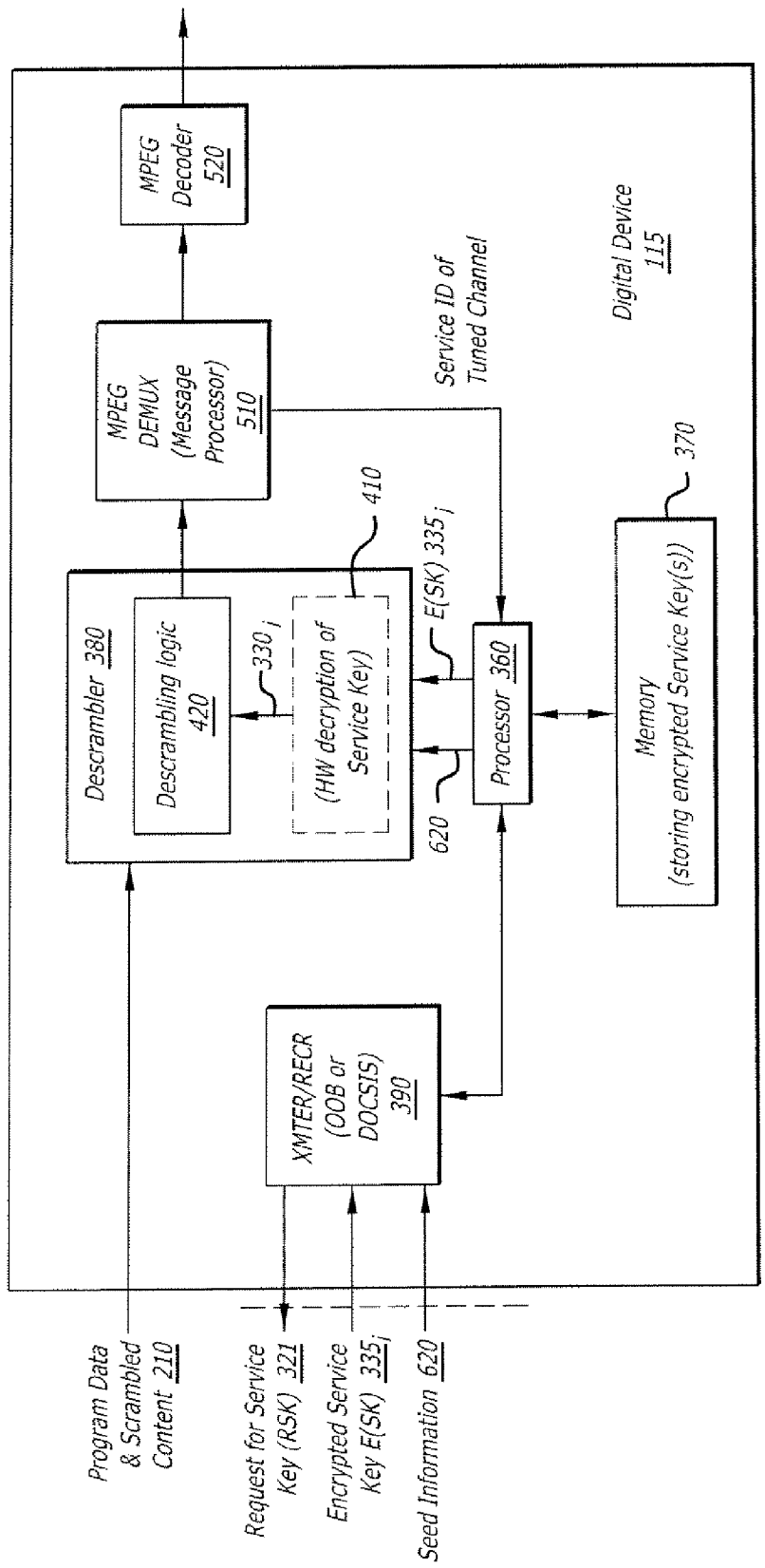
FIG. 4 is an exemplary embodiment of digital device of FIG. 3.

FIG. 4 provides a more detailed illustration of subscriber terminal device 110 of FIG. 3 adapted to headend 310 for request and receipt of the Service Key. According to one embodiment of the invention, program data 210 such as an Entitlement Control Message (ECM) or meta-data associated with an Electronic Program Guide (EPG) is provided to subscriber terminal device 110 by a content provider. The program data 210 is adapted to convey at least an identifier of the desired channel or service (referred to as "Channel or Service ID"). In the event that program data 210 is an IPPV or VOD program, program data 210 may further include a Program identifier (PID).

An MPEG Demultiplexer 510 operates as a message processor to extract the Channel or Service ID. The Channel or Service ID is routed to processor 360, which in combination with interface 390, operating as transmitter/receiver logic, generates the RSK message for routing to headend 310 over return channel 321.

Although not shown, the headend processes the RPK message. The RPK message may contain an address of subscriber terminal device 110 as well as information needed to identify the channel to be viewed (all of which may be obtained from Motion Picture Experts Group "MPEG" system and program information already processed by the insecure processor). The RPK message may be encrypted, if desired, for non-repudiation and prevention of denial of service attacks, such as IPPV or VOD requests for example.

Upon receipt of the RPK message, the headend accesses entries of an access control list (listing each entitlement of subscriber terminal device 110) and verifies subscriber terminal device 110 is authorization to receive a particular Service Key (e.g. SK $330_i$). If authorized, the headend sends E(SK) $335_i$ (SK $330_i$ encrypted using a copy of Root Key 350 based in part on Unique Key 430 contained in storage element 400 located in descrambler 380) to subscriber terminal device 110.

In response, E(SK) $335_i$ is received by interface 390 and routed to processor 360. Processor 360 may store E(SK) $335_i$ in internal memory, external memory 370 or provide SK $335_i$ to descrambler 380 for descrambling incoming scrambled content in real-time. For instance, memory 370 is an optional component for use if it is desirable to storage the E(SK) $335_i$ locally.

E(SK) $335_i$, along with seed information to generate Root Key 350, are provided to subscriber terminal device 110 through EMM or other control information and stored. These entitlements are subsequently compared to access requirements by a DRM processed by processor 360 or perhaps processing logic implemented within descrambler 380. DRM is recovered from memory 370 or on-chip internal memory of processor 360.

Upon receiving the scrambled digital content of the program data 210, descrambler 380 descrambles such content, which is subsequently supplied to MPEG decoder 520 if the content is compressed with a MPEG format. MPEG decoder 520 decompresses the digital content and subsequently routes the decompressed digital content to either a digital-to-analog (D/A) converter for display on a television, a Digital Video Interface (DVI) link or a network interface (e.g., IEEE 1394 link).

As shown, processor 360, memory 370, descrambler 380, transmitter/receiver logic 390, MPEG Demultiplexer 510 and MPEG decoder 520 may be implemented on two or more integrated circuits interconnected through bus traces or another communication scheme (e.g., wires, optical fiber, etc.). Alternatively, these components may be implemented on a single integrated circuit.

In this embodiment, SK $330_i$ may be valid for a certain period of time. Digital device 110 may store E(SK) $335_i$ in memory 370 as it comes over the network from the headend, allowing the subscriber terminal device to re-access the service if SK $330_i$ is still valid without having to request that Service Key again.

SK $330_i$ may be valid for the duration of a program or it may be valid for a selected period of time, e.g. prescribed number of hours. Using a key for a longer period of time will reduce the overall number of transactions between the subscriber terminal device and the headend because, once E(SK) $330_i$ is stored in memory 370 of subscriber terminal device 110, it is readily available. Depending on the duration of the current Service Key (e.g., SK), the next Service Key ($SK_{next}$) may be delivered along with the SK. Alternatively, subscriber terminal device 110 may request the $SK_{next}$ after detecting the end of the SK's valid Epoch (e.g., time duration of the SK). In different embodiments, the Service Key may be valid for a subscriber's subscription period.

Services can be sold a-la-carte or sold as a package. There may be several tiers of services, each identified by a Service ID. For example, there may be a basic tier of services, a medium tier offering more services, and advanced tiers offering different premium services. Each incremental tier of services may be given a separate Service Key.

In summary, as shown in FIGS. 3 and 4, digital device 115 of FIG. 4 comprises descrambler 380 with Unique Key 430 that is loaded during manufacture of digital device 115 or during manufacture of the subscriber terminal device. E(SK) $335_i$, being Service Key $330_i$ encrypted by Root Key 350, is delivered to the subscriber terminal device 110 and stored in encrypted form in digital device 115. Alternatively, subscriber terminal device 110 could request a Service Key each time that subscriber terminal device 110 tunes to a channel without storing the Service Key(s) locally. In addition, seed information 620 to produce Root Key 350 is provided as well.

The entitlements are normally held by the controlling authority such as a key server in headend 310 of FIG. 3 for example. Processor 360 in digital device 115 may receive a message (e.g., ECM and/or EMM), which identifies what digital device 115 is authorized to descramble so that it may properly display viewing options to a viewer. Thereafter, processor 360 can then request or generate Service Keys for selected channels once the received and previously stored entitlements are compared with the stored access requirements of subscriber terminal device 110.

Figure 5A:
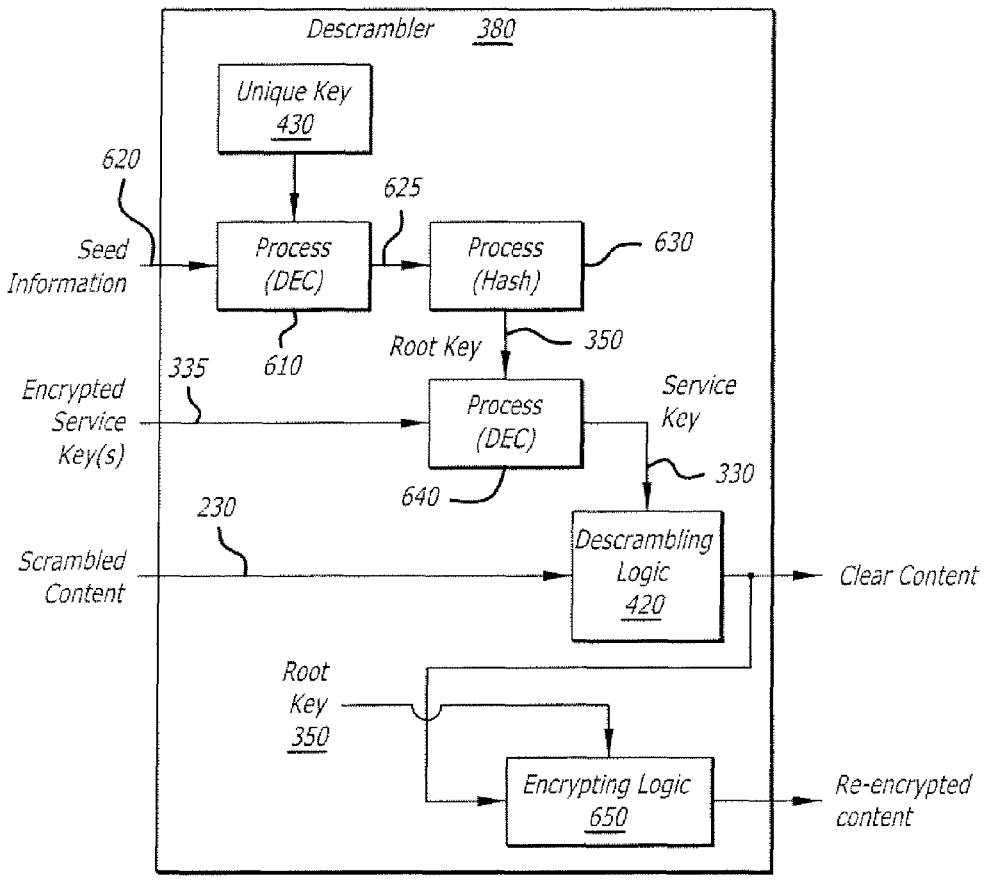
FIG. 5A is a first exemplary embodiment of the descrambler implemented within the digital device of FIG. 1.

FIG. 5A is a first exemplary embodiment of descrambler 380 implemented within subscriber terminal device 110 of FIG. 3. On receipt of control information, such as a series of keys, a first process block 610 computes Root Key 350. Root Key 350 is produced from a compilation of information 620 (referred to as "seed information") as described below. In particular, according to one embodiment of the invention, Root Key 350 is produced by first process block 610 initially processing seed information 620, namely decrypting a series of encrypted keys 620 using Unique Key 430. Each of these keys represents a group of subscriber terminal devices. The decryption (DEC) is in accordance with symmetric key cryptographic functions such as DES, AES, IDEA, 3DES and the like.

Thereafter, a second process block 630 conducts one-way hash operations on the decrypted keys 625. These hash operations are in accordance with a tree-like hashing structure as shown in FIGS. 6A-6C.

Figure 6A:
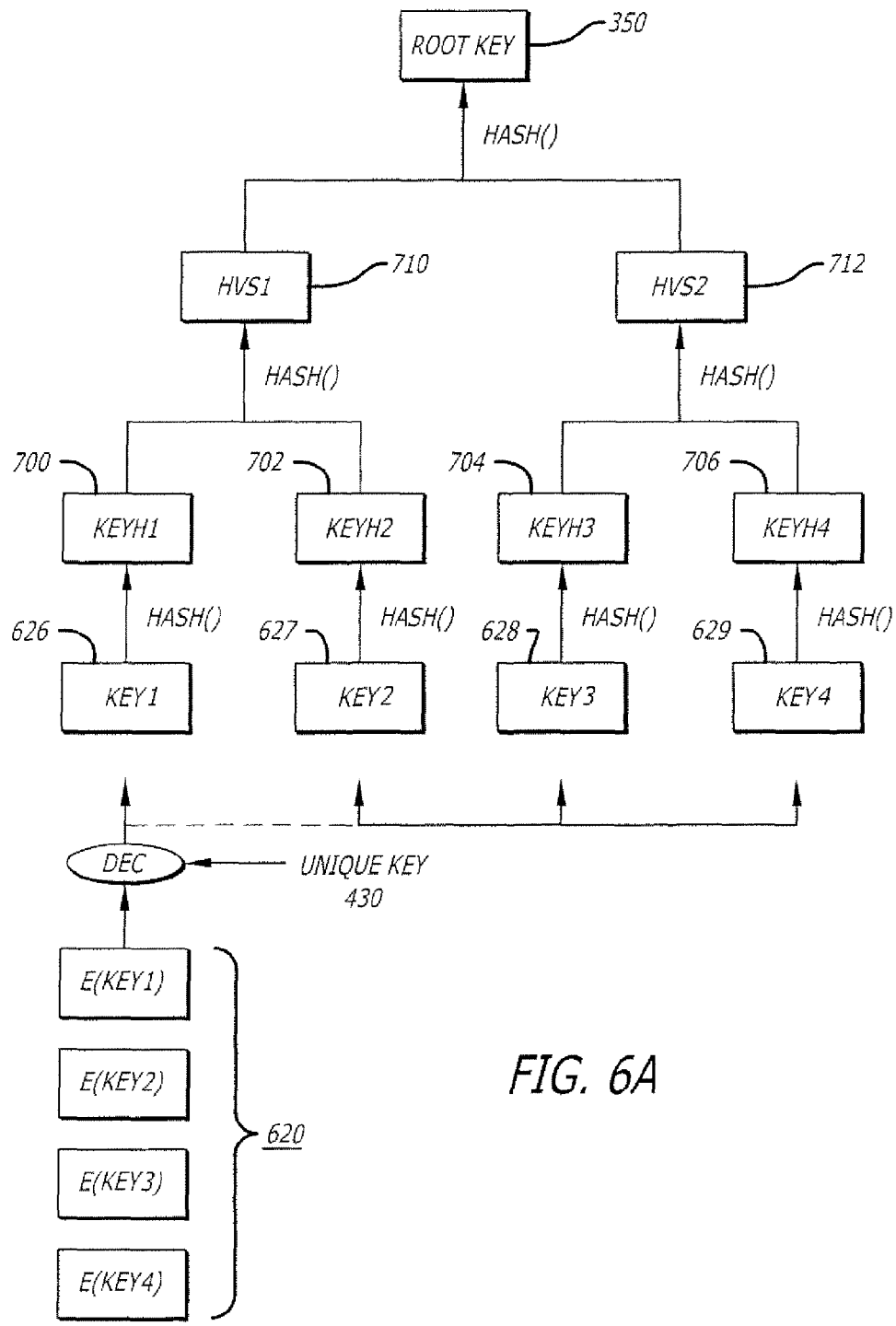
FIG. 6A is a first exemplary embodiment of computations for producing the Root Key.

In particular, with respect to a first embodiment of a hashing procedure shown in FIG. 6A, decrypted keys 625 (keys 626-629) undergo hash operations to produce corresponding hash values KEYH1-KEYH4 700, 702, 704, and 706. For this embodiment, the number of decrypted keys has been selected as four (4), namely $Key_1$ to $Key_4$ for clarity purposes. It is contemplated that a lesser or greater number of keys may be used. Moreover, the tree hierarchy may involve hash block computations based on more than two hash values, instead of two hash values as shown. Also, if there are an odd number of keys (or hash value sums), it is contemplated that a constant may be used for the key (or hash value sum) in order to provide a pairing.

Pairings of hash values 700, 702, 704, and 706 are combined and undergo another hash function to form hash value sums HVS1 710 and HVS2 712 as shown. For example, KEYHL 700 and KEYH2 702 are combined and hashed together to form HVS1 710 while KEYH3 704 and KEYH4 706 are combined and hashed together to form HVS2 712. Thereafter, HVS1 710 and HVS2 712 are combined and hashed together to produce a second-level hash value, which is Root Key 350 for this embodiment. When hash values are "combined," it is generally defined that an arithmetic operation is performed on these values. Examples of the arithmetic operations include concatenation, modular addition or other related operations.

Figure 6B:
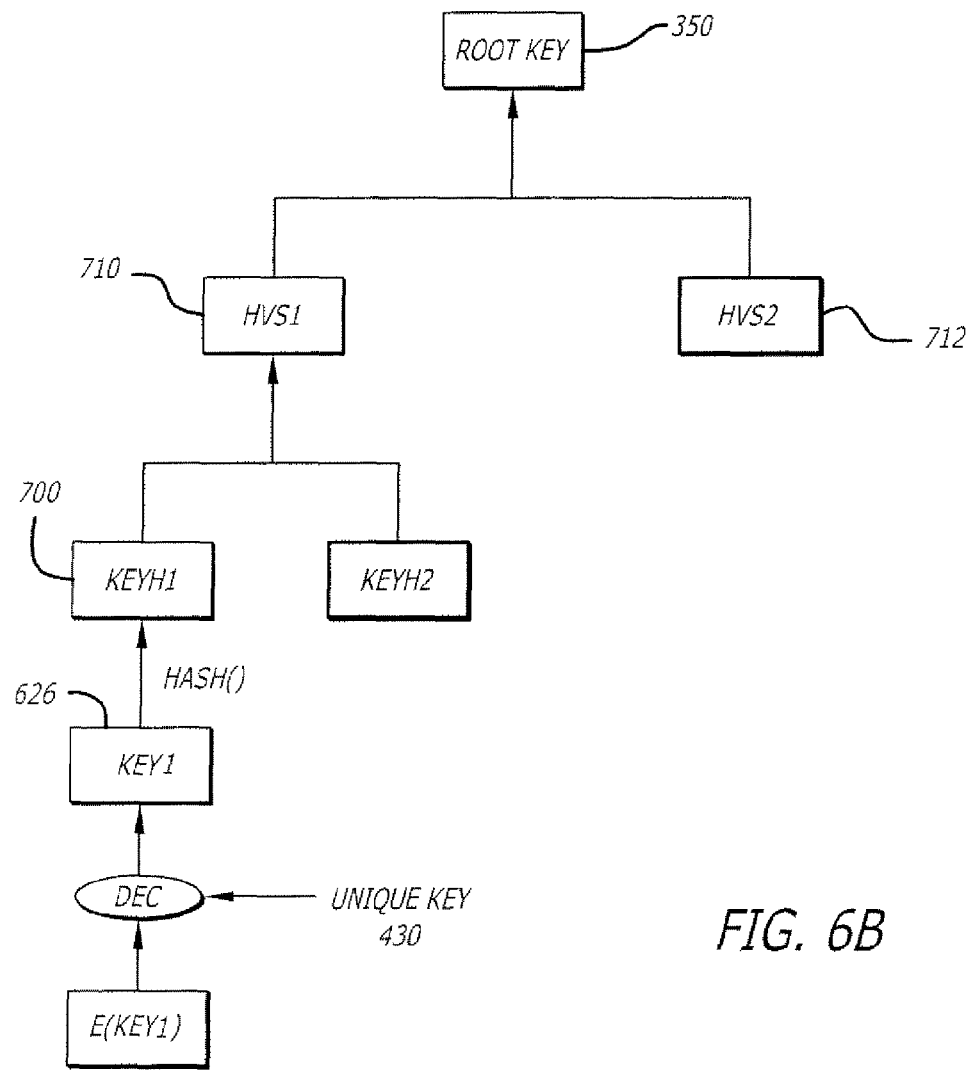
FIG. 6B is a second exemplary embodiment of computations for producing the Root Key.
Figure 6C:
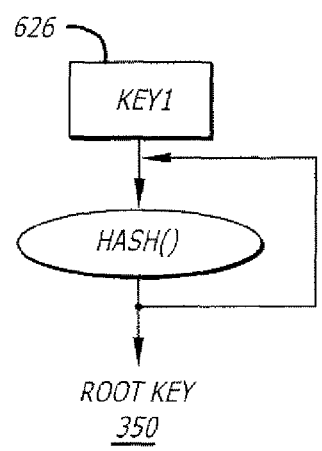
FIG. 6C is a third exemplary embodiment of computations for producing the Root Key.

According to another embodiment of the hashing procedure, as shown in FIG. 6B, Root Key 350 is produced by first process block of FIG. 5A initially decrypting at least one key (e.g., $Key_1$ 626) encrypted with Unique Key 430. Such decryption uses Unique Key 430 stored internally with storage element 400. Second process block of FIG. 5A subsequently performs one-way hash operations on the recovered $Key_1$ 626 to produce KEYH1 700. To optimize speed of this hashing procedure, KEYH2 702 and HVS2 712 values may be pre-computed and supplied to second process block 630 of FIG. 5A to produce Root Key 350.

According to yet another embodiment of the invention, as shown in FIG. 6C, second process block 630 produces Root Key 350 by performing iterative one-way hash operations on a seed value (e.g., $Key_1$ 626). Of course, other mechanisms may be used to produce Root Key 350.

Referring back to FIG. 5A, Root Key 350 is loaded into a third process block 640 that is used to decrypt encrypted Service Key(s) 335 to recover a service key 330 used to descramble scrambled content 230 loaded into the digital device and in particular descrambling logic 420. Descrambling logic 420 may be configured to perform 3DES operations on the scrambled content. The result may be content in a clear format, which is transmitted from descrambling logic 420 and subsequently loaded into a MPEG decoder as shown in FIG. 4 or optionally into a D/A converter, DVI Interface or IEEE 1394 interface.

Descrambler 380 further provides for re-encryption of the descrambled content received from descrambling logic 420. The descrambled content is loaded into encryption logic 650 and encrypted using Root Key 350. The re-encrypted content is provided to another component of the content delivery system, such as the secondary subscriber terminal device for example.

Figure 5B:
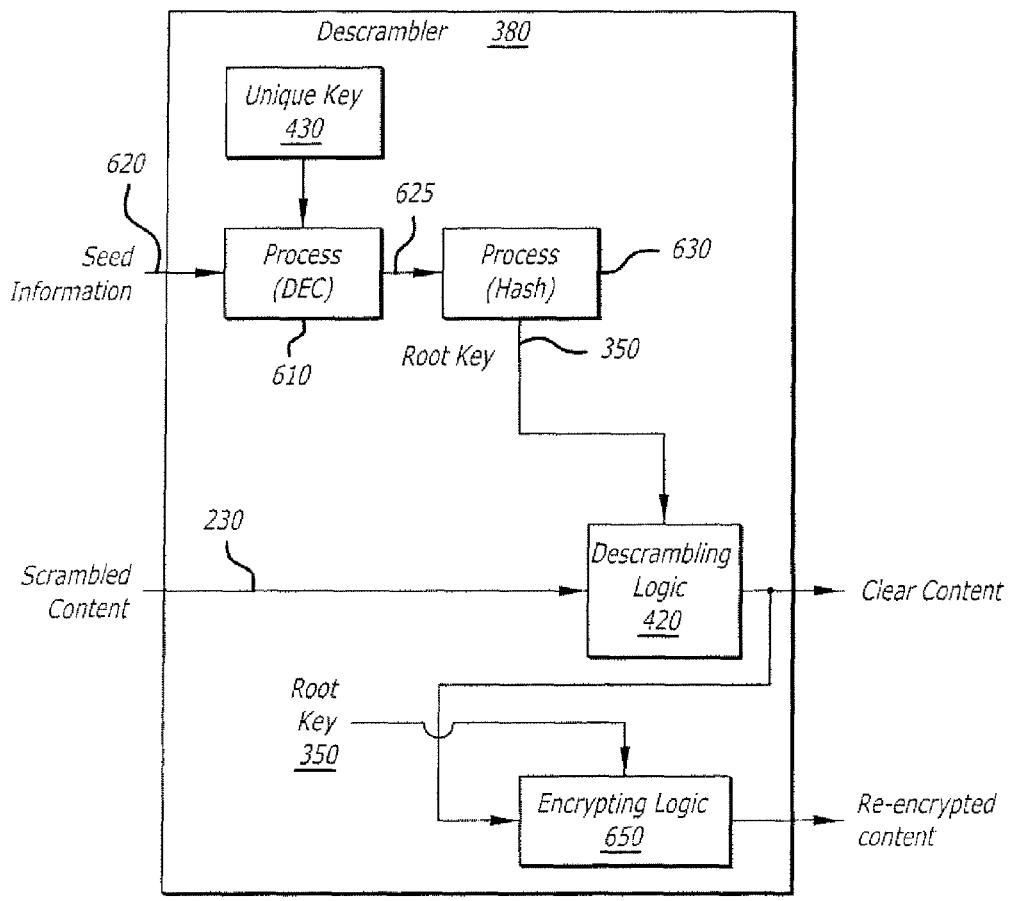
FIG. 5B is a second exemplary embodiment of the descrambler implemented within the digital device of FIG. 1.

Referring now to FIG. 5B, a second exemplary embodiment of descrambler 380 implemented within subscriber terminal device 110 of FIG. 3 is shown. On receipt of control information, such as a series of keys, first and second process blocks 610 and 630 compute Root Key 350 from seed information 620 as described above.

Instead of being loaded into third process block 640 to decrypt encrypted Service Key(s) 335, Root Key 330 is used to descramble scrambled content 230 loaded into descrambling logic 420. Descrambling may include performance of 3DES operations on the scrambled content. The result may be content in a clear format, which is transmitted from descrambling logic 420 and subsequently loaded into a MPEG decoder, a D/A converter, a DVI Interface, an IEEE 1394 interface or the like.

Descrambler 380 further provides for re-encryption of the descrambled content received from descrambling logic 420. The descrambled content is loaded into encryption logic 650 and encrypted using Root Key 350. The re-encrypted content is provided to a secondary subscriber terminal device or another component of the content delivery system.

Figure 5C:
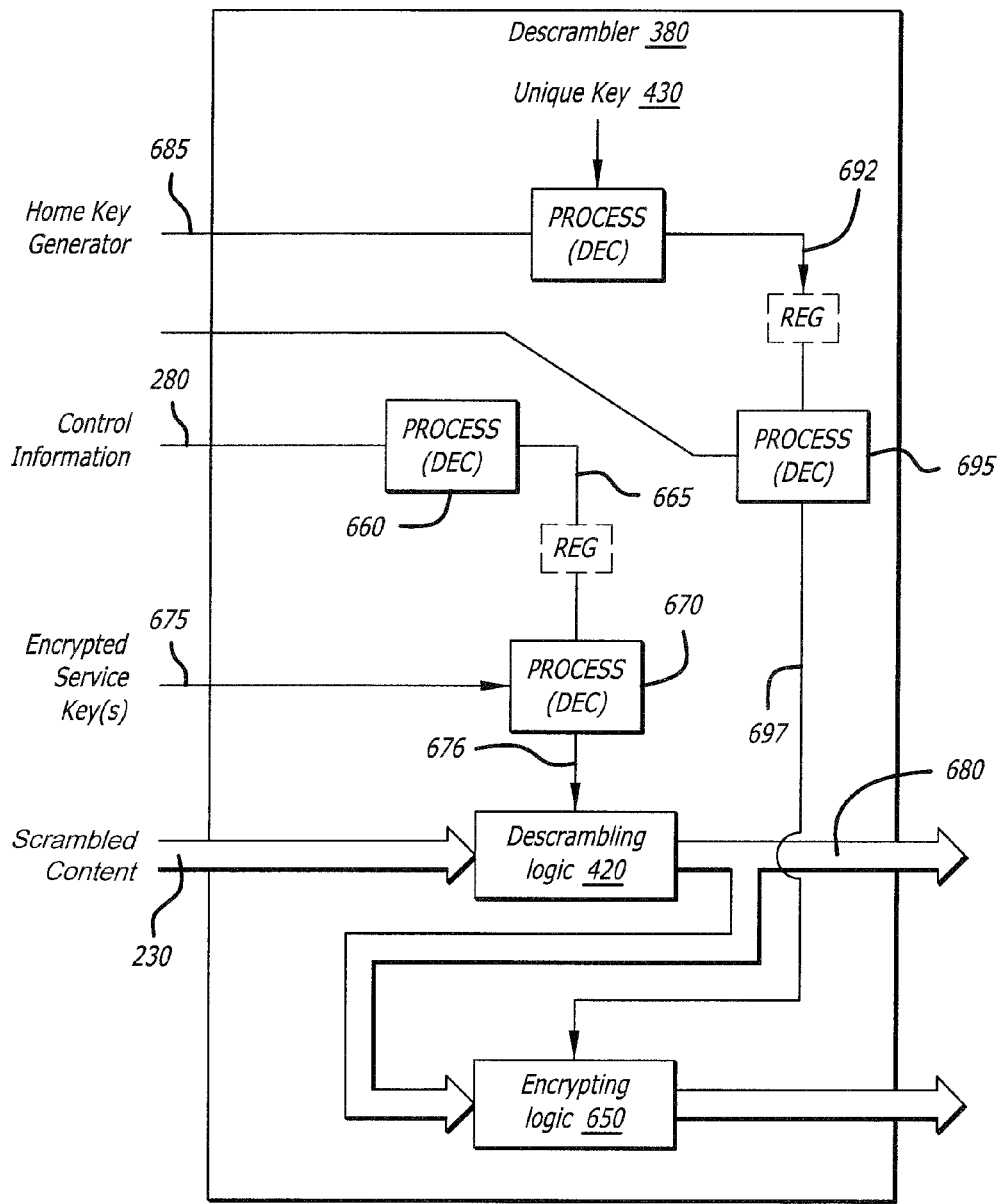
FIG. 5C is a third exemplary embodiment of the descrambler implemented within the digital device of FIG. 1.

FIG. 5C is a third exemplary embodiment of descrambler 380 implemented within subscriber terminal device 110 of FIG. 3. Descrambler 380 receives as input control information 280 and/or a home key generator (HKG) message 685. Control information 280 is processed by a first process block 660 in order to generate a key 665 that is used to descramble scrambled content 230.

According to one embodiment of the invention, control information 280 comprises one or more of the following: (1) a "Manufacturer ID" to identify a manufacturer of the digital device; (2) a "Service Provider ID" to identify the content delivery system provider as well as the selected distribution scheme (e.g., cable, satellite, terrestrial or Internet company supplying the requested program data); and (3) a "Sequence Number" being used for reordering packets of information if a key is more than one packet in length, and in certain systems, may also be used to indicate expiration of various control information.

As shown, key 665 is loaded into a second process block 670 that is used to decrypt encrypted Service Key(s) 675 to recover a service key 676 used to descramble scrambled content 230 as described above. The resultant descrambled content 680 is routed for display on the display device and as an input for re-encryption logic 650.

Concurrently, descrambler 380 receives as input HKG message 685. Formed by a Service Provider ID and perhaps other data (e.g., Sequence Number, identifier, etc.), HKG message 685 is processed by a third process block 690 in order to generate a key 692 that is a basis for re-encrypting descrambled content 680. Herein, key 692 may be provided to encryption logic 650 as the encryption key or is loaded into a fourth process block 695 to recover a key 697 used to encrypt descrambled content 680 as described above.

Figure 7A:
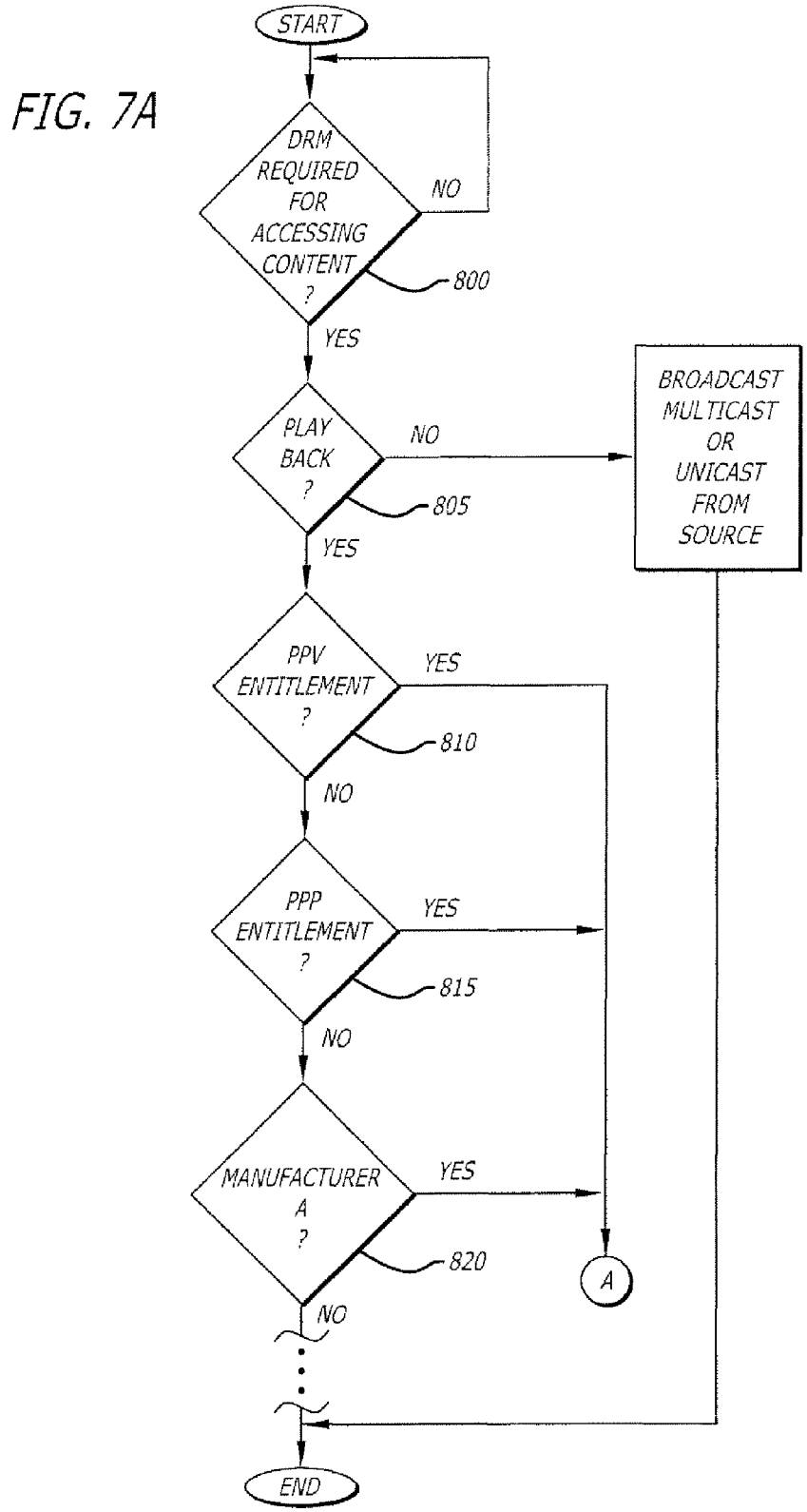
FIGS. 7A and 7B are exemplary flowcharts illustrating the operations of the digital rights management logic in combination with other components within the digital device of FIG. 1.
Figure 7B:
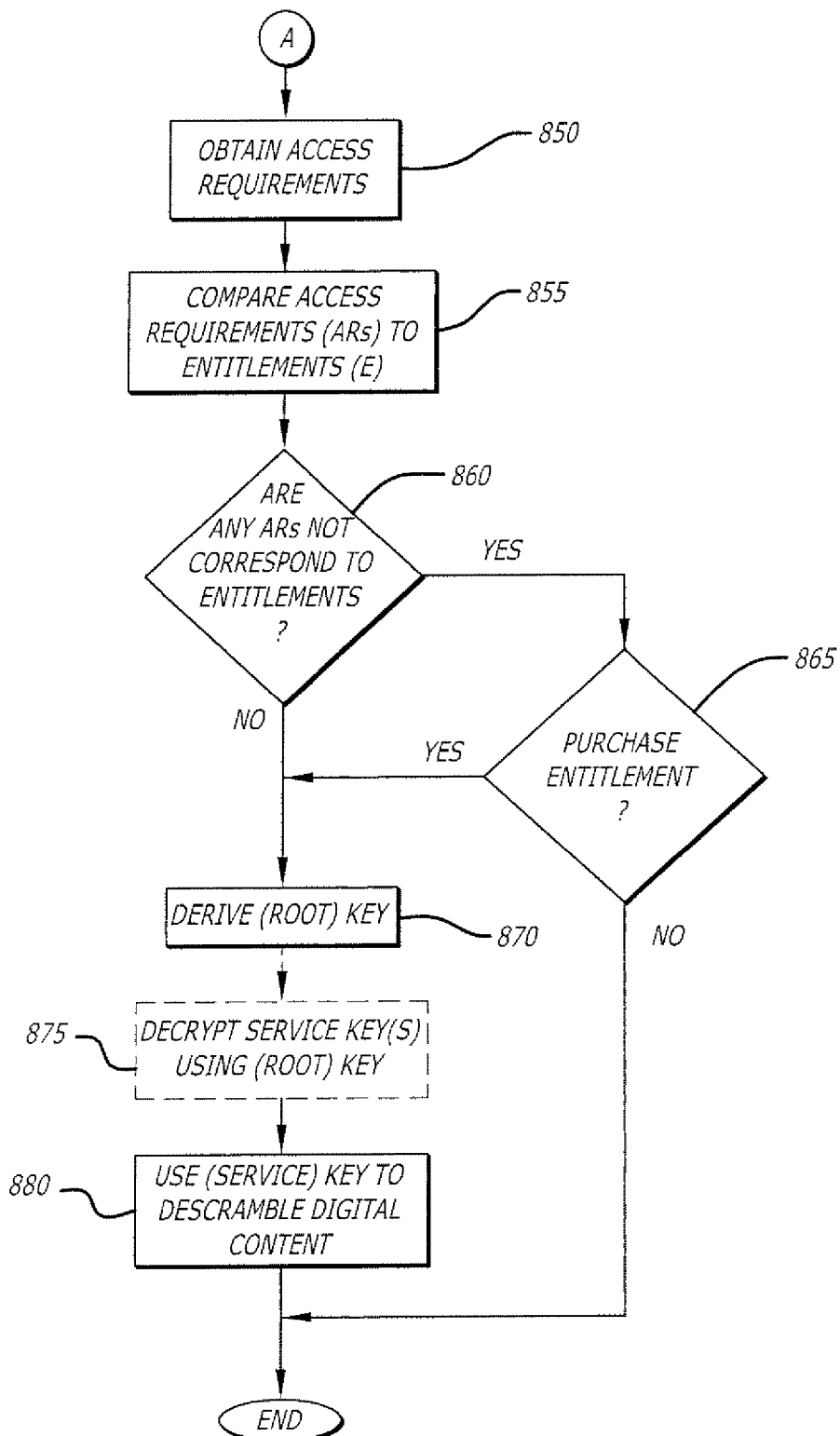

Referring now to FIGS. 7A and 7B, exemplary embodiments of a flowchart illustrating the operations of the digital rights management (DRM) performed by processor 360 within the digital device of FIGS. 3 and 4 are shown. Herein, for this illustrative embodiment, the DRM is stored within internal memory of processor 360 (or off-chip memory) and is configured to regulate entitlements (e.g., pay-per-play/time scheme) separate from key generation being handled by the descrambler. Thus, the DRM is re-programmable, provided a communication interface with the descrambler is maintained. The DRM is processed by processor 360, which is illustrated as the main CPU for the digital device.

As shown in FIG. 7A, a first determination is made whether a DRM is required by the subscriber for accessing content in the clear format (block 800). If so, a determination is made whether content is accessed based on a playback condition (where pre-stored content is accessed) or is based on content transmitted from a source (e.g., headend) as a broadcast, multicast or unicast transmission (block 805). The DRM operations in response to receipt via transmission may be identical for playback as described below. However, it is contemplated that the DRM may be coded to perform different operations based on whether the content is play back or received in a transmission, as illustrated herein.

If the content is accessed in a playback condition for example, the DRM analysis continues to determine what entitlements are to be enforced for incoming content (blocks 810, 815 and 820). For instance, with respect to playback, these entitlements may include, but are not limited to control of playback of the digital content (e.g., a pay-per-time "PPV" entitlement 810, pay-per-play "PPP" entitlement 815, digital device of a certain manufacturer type, etc.).

In the event that the content is accessed from a received transmission, other types of entitlements may be analyzed such as whether the content is part of a package or other tier of service, a free preview, recordable, able to be output a particular interface, and the like.

Referring now to FIG. 7B, the access requirements, namely control information from a preceding digital content such as terms and/or conditions of usage, number of plays allowed, keys required or the like, are obtained and compared to previously loaded entitlements (blocks 850 and 855). These entitlements may include, but are not limited or restricted to number of plays used, keys in possession and the like.

If the access requirements provided by the program data differ from the pre-loaded entitlements, the subscriber is prompted to determine whether he or she wishes to purchase the appropriate entitlement (blocks 860 and 865). As an example, the "prompt" may be accomplished through a screen pop-up image illustrated on a display of subscriber terminal device that has selectable fields. If the pre-loaded entitlements are to be purchased, the subscriber selects on appropriate field, causing a message is sent to an entity (e.g., original source of the content such as the headend, content distributor, designated key server, etc.) to return the desired entitlements to the subscriber's digital device. Otherwise, access is denied.

However, if a match is found between the access requirement(s) and entitlement(s), the descrambling process is conducted for this entitlement. For instance, if the entitlement involves the imposition of a maximum playback threshold (e.g., two playbacks) and a count value indicates that the digital content has been played back only once, the descrambling process may be conducted one more time to descramble the digital content.

More specifically, for the descrambling process, a key (e.g., Root Key) is derived using a collection of information such as keys in an encrypted format, which is loaded into the digital device (block 870). In particular, for a Root Key, it is derived from the information which may include data encrypted with the Unique Key particular to a certain subscriber terminal device. The key may be adapted to decrypt encrypted Service Key(s) loaded into the digital device (block 875). For this embodiment, the recovered Service Key(s) are now used to descramble the scrambled digital content provided by the program data (block 880). Otherwise, access is denied.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method for descrambling scrambled digital content within a subscriber terminal device, comprising:
   conducting digital rights management by a first component of the subscriber terminal device to determine whether entitlements needed for accessing digital content in a descrambled format are available to the subscriber terminal device; and
   deriving a key within a second component of the subscriber terminal device logically separate from and independent of the first component in response to determining that all of the entitlements needed for accessing the digital content are available to the subscriber terminal device, the key being used to decrypt service keys used for descrambling the scrambled digital content, wherein deriving the key comprises decrypting encrypted data using a Unique Key and subsequently conducting hash operations on the decrypted data to produce the key, wherein the key is a hash value.

2. The method of claim 1, wherein the first component is the main central processing unit (CPU), and the second component is a descrambler.

3. The method of claim 1, wherein prior to deriving the key, the method further comprising:
   prompting a subscriber of the subscriber terminal device to purchase an entitlement if the entitlement is needed to access the digital content and is currently unavailable to the subscriber terminal device.

4. The method of claim 3, wherein the prompting of the subscriber includes generating an image displayed on a display unit in communication with the subscriber terminal device, the image includes a selectable field.

5. The method of claim 4, wherein prior to deriving the key, the method further comprising:
   sending a message to a headend upon selection of the selectable field, the message being a request for a selected entitlement to be sent to the subscriber terminal device.

6. The method of claim 5, wherein selection of the selectable field is performed by a control unit accessible to the subscriber.

7. The method of claim 1, wherein conducting digital rights management includes analyzing a plurality of entitlements to be enforced, each of the plurality of entitlements controlling playback of the digital content.

8. An apparatus adapted to receive and descramble scrambled digital content, comprising:
   a processor to execute a Digital Rights Management (DRM) function to determine whether each entitlement needed to access the digital content in a descrambled format is pre-stored; and
   a descrambler to decrypt encrypted information using a Unique Key stored within a one-time programmable memory of the descrambler, the decrypted information being used to generate a key that is used to decrypt at least one service key used to descramble the scrambled digital content and recover the digital content upon determining that each entitlement needed to access the digital content is pre-stored, wherein the descrambler comprises a sequence of process blocks forming a key ladder, the sequence of process blocks includes at least a first process block and a second process block, the first process block to decrypt a plurality of keys encrypted with the Unique Key to produce a plurality of decrypted keys and the second process block to conduct one-way hash operations using the plurality of decrypted keys to produce the key, wherein the key is a hash value.

9. The apparatus of claim 8, wherein the processor and the descrambler are placed on a single integrated circuit.

10. The apparatus of claim 8, wherein the the key ladder is arranged to produce the key to recover the at least one service key for descrambling of the scrambled digital content.

11. The apparatus of claim 10, wherein the descrambler is implemented with the sequence of process blocks each having a dedicated function without a processor being employed within the descrambler.

12. The apparatus of claim 11, wherein a first process block of the sequence of process blocks to decrypt a plurality of keys encrypted with the Unique Key to produce a plurality of decrypted keys.

13. The apparatus of claim 12, wherein a second process block of the sequence of process blocks to conduct one-way hash operations using at least one of the plurality of decrypted keys and at least one pre-computed hash value to produce the key.

14. The apparatus of claim 13, wherein a third process block of the sequence of process blocks to descramble the incoming scrambled digital content to produce descrambled digital content.

15. The apparatus of claim 10 being coupled to a display, a hard disk recording unit and a subscriber terminal device over a transmission medium, wherein the descrambler comprises encrypting logic coupled to the plurality of process blocks, the encrypting logic to receive the descrambled digital content and to re-encrypt the digital content for transmission to the subscriber terminal device over the transmission medium.

16. An integrated circuit device adapted to descramble incoming scrambled content, comprising:
   a first component to execute a Digital Rights Management (DRM) function; and
   a second component including a one-time programmable memory storing a Unique Key and operating fully independent from the DRM function,
      the second component being implemented with a sequence of process blocks forming a key ladder, the sequence of process blocks including at least a first process block and a second process block,
      the second component, when operable, to decrypt encrypted information using the Unique Key in the first process block to produce decrypted information, and the decrypted information being hashed in the second process block to generate a key that is used to decrypt at least one service key used to descramble the scrambled content upon determining that each entitlement needed to access the content is stored within the integrated circuit, wherein the key is a hash value.

17. The integrated circuit device of claim 16, wherein the first component and the second component are placed on a single integrated circuit.

18. The integrated circuit device of claim 16, wherein the first component is a processor.

19. The integrated circuit device of claim 18, wherein the second component is a descrambler implemented with the sequence of process blocks each having a dedicated function, the key ladder arranged to produce the key to recover the at least one service key.

* * * * *